US009562712B2

(12) United States Patent
Kasuya

(10) Patent No.: US 9,562,712 B2
(45) Date of Patent: Feb. 7, 2017

(54) VEHICULAR AIR-CONDITIONING UNIT

(71) Applicant: Sanden Corporation, Isesaki-shi, Gunma (JP)

(72) Inventor: Junichiro Kasuya, Isesaki (JP)

(73) Assignee: Sanden Holdings Corporation, Isesaki-shi, Gunma (JP)

( * ) Notice: Subject to any disclaimer, the term of this patent is extended or adjusted under 35 U.S.C. 154(b) by 243 days.

(21) Appl. No.: 14/406,113

(22) PCT Filed: Jun. 12, 2013

(86) PCT No.: PCT/JP2013/003678
§ 371 (c)(1),
(2) Date: Dec. 5, 2014

(87) PCT Pub. No.: WO2014/002411
PCT Pub. Date: Jan. 3, 2014

(65) Prior Publication Data
US 2015/0121930 A1    May 7, 2015

(30) Foreign Application Priority Data

Jun. 29, 2012   (JP) ................................. 2012-146397

(51) Int. Cl.
*F25B 27/00*  (2006.01)
*F25D 21/08*  (2006.01)
(Continued)

(52) U.S. Cl.
CPC ........... *F25D 21/08* (2013.01); *B60H 1/00921* (2013.01); *F25B 5/00* (2013.01);
(Continued)

(58) Field of Classification Search
CPC ...... Y02B 30/12; F25B 29/003; F25B 49/002; B60H 1/00371
(Continued)

(56) References Cited

U.S. PATENT DOCUMENTS 5,291,941 A * 3/1994 Enomoto ........... B60H 1/00007
165/43
6,293,117 B1 * 9/2001 Ban ..................... B60H 1/3225
62/228.3
(Continued)

FOREIGN PATENT DOCUMENTS

JP    H05-223357 A    8/1993
JP    H06-002979 A    1/1994
(Continued)

OTHER PUBLICATIONS

Japan Patent Office; Notification of Reasons for Rejection issued for Japanese Patent Application No. 2012-146397, mailed May 17, 2016.

*Primary Examiner* — Melvin Jones
(74) *Attorney, Agent, or Firm* — Baker Botts L.L.P.

(57) ABSTRACT

The heating capacity particularly at low outside air temperatures in a vehicular air-conditioning unit that heats the vehicle interior by heat pump operation of a refrigerant circuit using a compressor is improved. During heating, a refrigerant discharged from a compressor 2 releases heat in a radiator 4 into the vehicle interior, and the refrigerant decompressed after the heat release in the radiator evaporates in at least one of an external heat exchanger 7 and a ventilation heat exchanger 24. During cooling, the refrigerant discharged from the compressor releases heat in the external heat exchanger, and the refrigerant decompressed after the heat release in the external heat exchanger evaporates in an internal heat exchanger 9 to absorb heat from the vehicle interior. The vehicular air-conditioning unit includes a hot gas cycle circuit 31 for decompressing a part of the refrigerant discharged from the compressor, and causing the
(Continued)

decompressed part of the refrigerant to flow through the internal heat exchanger to release heat into the vehicle interior.

12 Claims, 17 Drawing Sheets

(51) Int. Cl.
- *B60H 1/00* (2006.01)
- *F25B 29/00* (2006.01)
- *F25B 6/04* (2006.01)
- *F25B 41/04* (2006.01)
- *F25B 47/02* (2006.01)
- *F25B 49/02* (2006.01)
- *F25B 5/00* (2006.01)

(52) U.S. Cl.
CPC .............. *F25B 6/04* (2013.01); *F25B 29/003* (2013.01); *F25B 41/04* (2013.01); *F25B 47/022* (2013.01); *F25B 49/02* (2013.01); *B60H 2001/00949* (2013.01); *F25B 2700/1933* (2013.01); *F25B 2700/21172* (2013.01); *F25B 2700/21174* (2013.01); *F25B 2700/21175* (2013.01)

(58) Field of Classification Search
USPC ........... 62/154, 165, 228.1, 238.6, 239, 244; 165/42, 63, 202
See application file for complete search history.

(56) References Cited

U.S. PATENT DOCUMENTS 7,013,966 B2 * 3/2006 Takano .............. B60H 1/00914
165/202
2012/0011869 A1 1/2012 Kondo et al.

FOREIGN PATENT DOCUMENTS

| JP | 3321871 B2 | 6/2002 |
|----|------------|--------|
| JP | 2003-240371 A | 8/2003 |
| JP | 2011-152808 A | 8/2011 |
| JP | 2012-076589 A | 4/2012 |
| WO | 2011/016264 A1 | 2/2011 |

* cited by examiner

⟨DEFROSTING OF EXTERNAL HEAT EXCHANGER⟩

⟨DEFROSTING OF VENTILATION HEAT EXCHANGER⟩

<HEATING>

<DEFROSTING OF EXTERNAL HEAT EXCHANGER>

VEHICULAR AIR-CONDITIONING UNIT

CROSS-REFERENCE TO RELATED APPLICATIONS

This application is a U.S. National Stage Patent Application under 37 U.S.C. §371 of International Patent Application No. PCT/JP2013/003678, filed on Jun. 12, 2013, which claims the benefit of Japanese Patent Application No. JP 2012-146397, filed on Jun. 29, 2012, the disclosures of which are incorporated herein by reference in their entirety.

TECHNICAL FIELD

The present invention relates to a vehicular air-conditioning unit for air-conditioning the vehicle interior of a vehicle using a heat pump formed by a refrigerant circuit that includes a compressor, a radiator, and external and internal heat exchangers.

BACKGROUND ART

Conventionally, the vehicle interior of a vehicle that runs on an engine (internal combustion engine) is cooled or dehumidified by an air-conditioning unit in which a refrigerant circuit includes a compressor driven by the engine, and heated using engine waste heat.

An electric vehicle that runs on an electric motor and a hybrid vehicle that combines an engine and an electric motor are commercialized in recent years, for the purpose of helping to resolve global environmental issues. The vehicle interior of such a vehicle is cooled or dehumidified by driving an electric compressor included in a refrigerant circuit of an air-conditioning unit with power of a charged battery.

To heat the vehicle interior, on the other hand, engine waste heat can be used in a hybrid vehicle. In a pure electric vehicle, however, engine waste heat is unavailable. The only way is either to draw heat from the outside air by heat pump operation of the air-conditioning unit to heat the vehicle interior, or to use an electric heater. The electric heater has, however, a COP (coefficient of performance) of 1 at the maximum, and consumes a large amount of power stored in the battery. This leads to a shorter cruising range of the electric vehicle.

A COP greater than or equal to 1 can be achieved by heating the vehicle interior by the heat pump operation in which the electric compressor is driven to draw heat from the outside air by an external heat exchanger. In a low outside air temperature environment such as in the middle of winter, however, the temperature difference in pumping is significant and the compression ratio of the compressor is high, and so there is the problem of decreased heating capacity or efficiency.

In view of this, the following air-conditioning unit has been previously developed: a ventilation heat exchanger for recovering heat from the air discharged from the vehicle interior for ventilation is provided to recover heat from the ventilation air in addition to the heat pump from the outside air, thus heating the vehicle interior (see Patent Document 1).

CITATION LIST

Patent Documents

Patent Document 1: Japanese Unexamined Patent Application Publication No. 2011-152808

Patent Document 2: Japanese Unexamined Patent Application Publication No. 5-223357

SUMMARY OF THE INVENTION

Problems to be Solved by the Invention

However, when the evaporation temperature of the refrigerant in the external heat exchanger drops to 0° C. or below at low outside air temperatures, frost grows on the external heat exchanger and the external heat exchanger is clogged. The performance of heat exchange with the outside air deteriorates in such a state, resulting in significantly lower heat pump performance. To overcome this, it is necessary to stop the circulation of the refrigerant through the external heat exchanger for ventilation with the outside air or energize a defrosting heater to defrost the external heat exchanger. Thus, even when the heat pump using the ventilation heat exchanger is employed, the capacity of heating the vehicle interior decreases significantly during defrosting.

In the case of defrosting the external heat exchanger, frost is hardly melted by ventilation in a situation where the outside air is below freezing. Besides, the use of the defrosting heater consumes battery power and further shortens the cruising range.

Regarding a vehicular air-conditioning unit that heats the vehicle interior using engine waste heat, on the other hand, the following supplemental heating technique has been developed: a high temperature refrigerant discharged from a compressor is caused to flow through an evaporator in a refrigerant circuit, which is normally used for cooling, to release heat (for example, see Patent Document 2).

The present invention has been made in view of such conventional circumstances, and has an object of improving the heating capacity particularly at low outside air temperatures in a vehicular air-conditioning unit that heats the vehicle interior by heat pump operation of a refrigerant circuit using a compressor.

Means for Solving the Problems

A vehicular air-conditioning unit according to the invention of claim 1 is a vehicular air-conditioning unit in which: a refrigerant circuit includes a compressor, a radiator, an external heat exchanger, an internal heat exchanger, and a ventilation heat exchanger for absorbing heat from air discharged from a vehicle interior to outside; during heating, a refrigerant discharged from the compressor releases heat in the radiator into the vehicle interior, and the refrigerant decompressed after the heat release in the radiator evaporates in at least one of the external heat exchanger and the ventilation heat exchanger; and during cooling, the refrigerant discharged from the compressor releases heat in the external heat exchanger, and the refrigerant decompressed after the heat release in the external heat exchanger evaporates in the internal heat exchanger to absorb heat from the vehicle interior, the vehicular air-conditioning unit including a hot gas cycle circuit for decompressing a part of the refrigerant discharged from the compressor, and causing the decompressed part of the refrigerant to flow through the internal heat exchanger to release heat into the vehicle interior.

A vehicular air-conditioning unit according to the invention of claim 2 is the vehicular air-conditioning unit according to the foregoing invention, wherein in at least one of the case where the external heat exchanger is to he defrosted and the case where an outside air temperature is a predetermined low value during heating, the refrigerant having released heat in the radiator is decompressed and caused to flow through the ventilation heat exchanger while the refrigerant is kept from flowing through the external heat exchanger, and the part of the refrigerant discharged from the compressor is caused to flow through the hot gas cycle circuit.

A vehicular air-conditioning unit according to the invention of claim 3 is the vehicular air-conditioning unit according to the foregoing invention, wherein the refrigerant having evaporated in the external heat exchanger or the refrigerant having passed through the hot gas cycle circuit and released heat in the internal heat exchanger is sucked into a low pressure part of the compressor, and the refrigerant having evaporated in the ventilation heat exchanger is returned to an intermediate pressure part of the compressor.

A vehicular air-conditioning unit according to the invention of claim 4 is the vehicular air-conditioning unit according to the foregoing invention, wherein in the case where the refrigerant is kept from flowing through the external heat exchanger and the hot gas cycle circuit or in the case where a temperature of the vehicle interior is a predetermined low value, the refrigerant having evaporated in the ventilation heat exchanger is returned to the low pressure part of the compressor.

A vehicular air-conditioning unit according to the invention of claim 5 is the vehicular air-conditioning unit according to the invention of claim 2, wherein in a state where flow of the refrigerant into the external heat exchanger and flow of the refrigerant into the ventilation heat exchanger are stopped alternately during heating, whether or not the heat exchanger needs to be defrosted is determined, and the refrigerant is kept from flowing through the ventilation heat exchanger in the case of defrosting the ventilation heat exchanger.

A vehicular air-conditioning unit according to the invention of claim 6 is the vehicular air-conditioning unit according to the invention of claim 2, wherein during heating, a state in which the refrigerant is caused to flow through the external heat exchanger while the refrigerant is kept from flowing through the hot gas cycle circuit is resumed in the case where defrosting of the external heat exchanger is completed, and whether or not the defrosting of the external heat exchanger is completed is not determined in the case where a temperature of the outside is below freezing.

A vehicular air-conditioning unit according to the invention of claim 7 is the vehicular air-conditioning unit according to the invention of claim 1, including an evaporation pressure regulation valve for preventing an evaporation temperature of the refrigerant in the ventilation heat exchanger from dropping below freezing.

A vehicular air-conditioning unit according to the invention of claim 8 is the vehicular air-conditioning unit according to the invention of claim 1, wherein air of the vehicle interior having passed through the ventilation heat exchanger is circulated through the external heat exchanger.

A vehicular air-conditioning unit according to the invention of claim 9 is the vehicular air-conditioning unit according to the foregoing invention, including a duct for circulating outside air through the external heat exchanger, wherein the air of the vehicle interior having passed through the ventilation heat exchanger is caused to flow into the duct on an upstream side of the external heat exchanger, and an opening of an inflow part for the air of the vehicle interior is narrowed.

A. vehicular air-conditioning unit according to the invention of claim 10 is the vehicular air-conditioning unit according to the foregoing invention, including a damper for regulating the opening of the inflow part for the air of the vehicle interior in the duct.

A vehicular air-conditioning unit according to the invention of claim 11 is the vehicular air-conditioning unit according to the invention of claim 1, including an electric heater for heating the vehicle interior during heating.

A vehicular air-conditioning unit according to the invention of claim 12 is a vehicular air-conditioning unit in which: a refrigerant circuit includes a compressor, a radiator, an external heat exchanger, an internal heat exchanger, and a ventilation heat exchanger for absorbing heat from air discharged from a vehicle interior to outside; during heating, a refrigerant discharged from the compressor releases heat in the radiator into the vehicle interior, and the refrigerant decompressed after the heat release in the radiator evaporates in at least one of the external heat exchanger and the ventilation heat exchanger; and during cooling, the refrigerant discharged from the compressor releases heat in the external heat exchanger, and the refrigerant decompressed after the heat release in the external heat exchanger evaporates in the internal heat exchanger to absorb heat from the vehicle interior, the vehicular air-conditioning unit including an electric heater, wherein in the case of defrosting the external heat exchanger during heating, the refrigerant having released heat in the radiator is decompressed and caused to flow through the ventilation heat exchanger while the refrigerant is kept from flowing through the external heat exchanger, and the vehicle interior is heated by the electric heater.

Advantageous Effect of the Invention

According to the invention of claim 1, a vehicular air-conditioning unit in which: a refrigerant circuit includes a compressor, a radiator, an external heat exchanger, an internal heat exchanger, and a ventilation heat exchanger for absorbing heat from air discharged from a vehicle interior to outside; during heating, a refrigerant discharged from the compressor releases heat in the radiator into the vehicle interior, and the refrigerant decompressed after the heat release in the radiator evaporates in at least one of the external heat exchanger and the ventilation heat exchanger; and during cooling, the refrigerant discharged from the compressor releases heat in the external heat exchanger, and the refrigerant decompressed after the heat release in the external heat exchanger evaporates in the internal heat exchanger to absorb heat from the vehicle interior, includes a hot gas cycle circuit for decompressing a part of the refrigerant discharged from the compressor, and causing the decompressed part of the refrigerant to flow through the internal heat exchanger to release heat into the vehicle interior. A part of the high temperature refrigerant discharged from the compressor flows through the hot gas cycle circuit. As a result, heat can be released by the internal heat exchanger into the vehicle interior to thereby heat the vehicle interior, in addition to the heating by the radiator.

For example, as in the invention of claim 2, in the case where the external heat exchanger is to be defrosted or in the case where an outside air temperature is a predetermined low value and drawing heat from outside air is impossible or difficult during heating, the refrigerant having released heat in the radiator is decompressed and caused to flow through the ventilation heat exchanger while the refrigerant is kept from flowing through the external heat exchanger, and the part of the refrigerant discharged. from the compressor is caused to flow through the hot gas cycle circuit. In this way, the ventilation heat exchanger can draw and recover heat from the air of the vehicle interior discharged to the outside, while the radiator and the internal heat exchanger heat the vehicle interior.

Therefore, the vehicle interior can be heated very effectively and efficiently by heat pump operation in a low outside air temperature environment, and also the external heat exchanger can be simultaneously defrosted by ventilation with the outside air in a situation where the outside air temperature is above freezing. Particularly in an electric vehicle in which a compressor is driven by a battery, excellent vehicle interior air-conditioning can be realized without a decrease in cruising range.

Moreover, as in the invention of claim 3, the refrigerant having evaporated in the external heat exchanger or the refrigerant having passed through the hot gas cycle circuit and released heat in the internal heat exchanger is sucked into a low pressure part of the compressor, and the refrigerant having evaporated in the ventilation heat exchanger is returned to an intermediate pressure part of the compressor. This increases the refrigerant circulation amount of the radiator to increase the heat release capacity and also reduces the compression work in the compressor, thus contributing to improved efficiency.

Here, as in the invention of claim 4, in the case where the refrigerant is kept from flowing through the external heat exchanger and the hot gas cycle circuit, the refrigerant having evaporated in the ventilation heat exchanger is switched to be returned to the low pressure part of the compressor. This allows the compressor to perform the compression work smoothly even in a situation where the refrigerant returns to the compressor only from the ventilation heat exchanger.

In the case where a temperature of the vehicle interior is a predetermined low value, too, the refrigerant having evaporated in the ventilation heat exchanger is returned to the low pressure part of the compressor. This allows the compressor to smoothly suck the refrigerant having passed through the ventilation heat exchanger, even in a situation where the refrigerant temperature in the ventilation heat exchanger is low and the pressure is less than or equal to the intermediate pressure part of the compressor.

Moreover, as in the invention of claim 5, in a state where flow of the refrigerant into the external heat exchanger and flow of the refrigerant into the ventilation heat exchanger are stopped alternately during heating, whether or not the heat exchanger needs to be defrosted is determined. Whether or not each of the external heat exchanger and the ventilation heat exchanger is clogged with frost and needs to be defrosted can be adequately determined in this way. In the case where the ventilation heat exchanger is clogged with frost, the refrigerant is kept from flowing through the ventilation heat exchanger. As a result, the ventilation heat exchanger can be smoothly defrosted by the relatively high temperature air of the vehicle interior.

As in the invention of claim 6, during heating, a state in which the refrigerant is caused to flow through the external heat exchanger while the refrigerant is kept from flowing through the hot gas cycle circuit is resumed in the case where defrosting of the external heat exchanger is completed. The heat pump operation of drawing heat from the outside air can thus be resumed smoothly.

Here, whether or not the defrosting of the external heat exchanger is completed is not determined in the case where a temperature of the outside is below freezing. Control can be simplified by avoiding the needless defrosting completion determination in a situation where defrosting the external heat exchanger by the outside air is difficult.

Moreover, as in the invention of claim 7, the vehicular air-conditioning unit includes an evaporation pressure regulation valve, for preventing an evaporation temperature of the refrigerant in the ventilation heat exchanger from dropping below freezing. Since the ventilation heat exchanger is maintained free of frost, the suspension of the function of the ventilation heat exchanger for defrosting can be prevented.

Furthermore, as in the invention of claim 8, air of the vehicle interior having passed through the ventilation heat exchanger is circulated through the external heat exchanger. During heating, the air of the vehicle interior which is still higher in temperature than the outside air even after passing through the ventilation heat exchanger flows through the external heat exchanger, to increase the temperature of the outside air with which the external heat exchanger is ventilated. This increases the evaporation temperature, with it being possible to reduce the power for the compressor.

During cooling, on the other hand, the air of the vehicle interior which is lower in temperature than the outside air flows through the external heat exchanger, to decrease the temperature of the outside air with which the external heat exchanger is ventilated. This decreases the condensation temperature, with it being possible to equally reduce the power for the compressor.

In particular, as in the invention of claim 9, the vehicular air-conditioning unit includes a duct for circulating outside air through the external heat exchanger, wherein the air of the vehicle interior having passed through the ventilation heat exchanger is caused to flow into the duct on an upstream side of the external heat exchanger. The air of the vehicle interior having passed through the ventilation heat exchanger can thus be smoothly guided to the external heat exchanger. In addition, an opening of an inflow part for the air of the vehicle interior is narrowed. This removes the drawback in that the air of the vehicle interior sucked out by the Venturi effect increases too much.

Here, as in the invention of claim 10, the vehicular air-conditioning unit includes a damper for regulating the opening of the inflow part for the air of the vehicle interior in the duct. The damper can regulate the air of the vehicle interior sucked out. As a result, the amount of ventilation from the vehicle interior can be kept constant even when the amount of outside air with which the external heat exchanger is ventilated changes due to, for example, a change in vehicle speed or rotation speed of a fan for the external heat exchanger.

As in the invention of claim 11, the vehicular air-conditioning unit includes an electric heater for heating the vehicle interior during heating. The capacity of heating the vehicle interior of the electric vehicle is supplemented by she electric heater within the allowable range of the battery. This creates a more comfortable vehicle interior environment.

According to the invention of claim 12, a vehicular air-conditioning unit in which: a refrigerant circuit includes a compressor, a radiator, an external heat exchanger, an internal heat exchanger, and a ventilation heat exchanger for absorbing heat from air discharged from a vehicle interior to outside; during heating, a refrigerant discharged from the compressor releases heat in the radiator into the vehicle interior, and the refrigerant decompressed after the heat release in the radiator evaporates in at least one of she external heat exchanger and the ventilation heat exchanger; and during cooling, the refrigerant discharged from the compressor releases heat in the external heat exchanger, and the refrigerant decompressed after the heat release in the external heat exchanger evaporates in the internal heat exchanger to absorb heat from the vehicle interior, includes an electric heater, wherein in the case of defrosting the external heat exchanger during heating, the refrigerant having released heat in the radiator is decompressed and caused to flow through the ventilation heat exchanger while the refrigerant is kept from flowing through. the external heat exchanger, and the vehicle interior is heated by the electric heater. The electric heater can heat the vehicle interior in addition to the heating by the heat release from the radiator, and also the ventilation heat exchanger can recover heat from the air of the vehicle interior discharged to the outside.

In the case where heat cannot be drawn from the outside air by heat pump operation because of the need to defrost the external, heat exchanger during heating, the electric heater supplements the heating by the radiator. This contributes to comfortable vehicle interior heating even at low outside air temperatures. Moreover, the ventilation heat exchanger recovers heat discarded to the outside, thus minimizing the decrease in efficiency. Therefore, the decrease in cruising range can be minimized particularly in an electric vehicle in which a compressor is driven by a battery. If the outside air temperature is above freezing, the external heat exchanger can be simultaneously defrosted by outside air ventilation.

MODE FOR CARRYING OUT THE INVENTION

Figure 1:
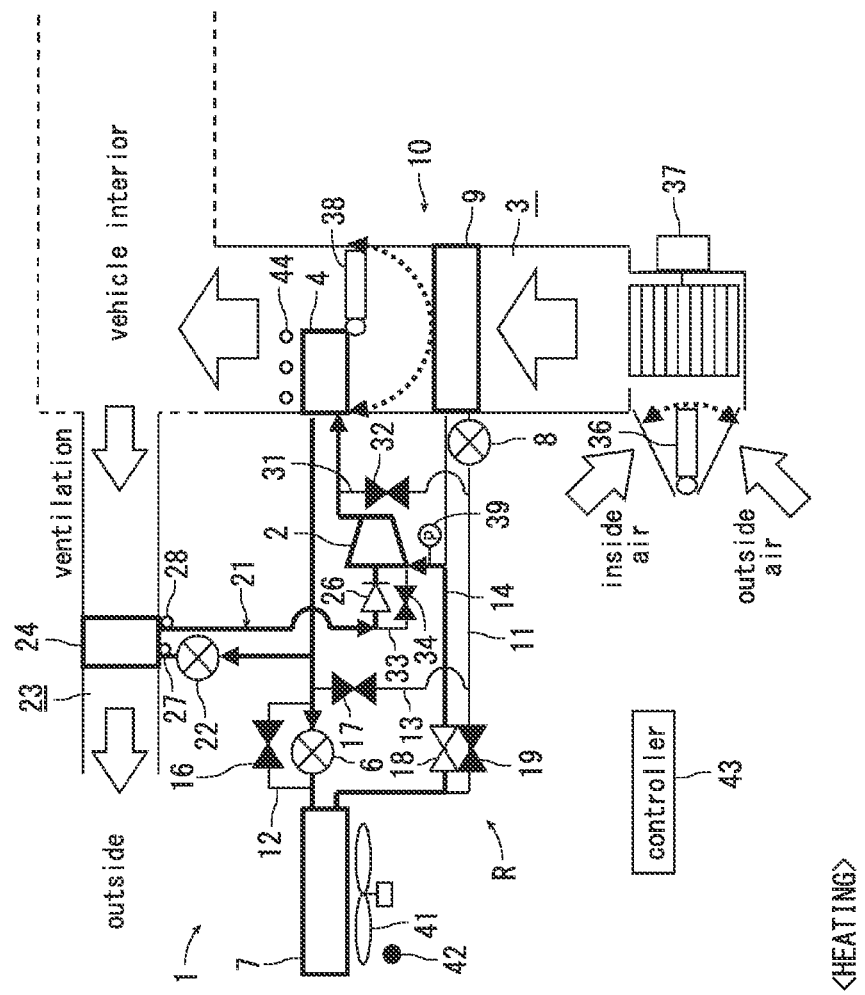
FIG. 1 is a diagram for describing the state during heating of a vehicular air-conditioning unit in an embodiment to which the present invention is applied (Embodiment 1).

The following describes embodiments of the present invention in detail based on drawings.
Embodiment 1

FIGS. 1 to 7 are diagrams of a vehicular air-conditioning unit 1 according to Embodiment 1 of the Present invention. A vehicle in this embodiment to which the present invention is applied is an electric vehicle (EV) having no engine (internal combustion engine), and runs by driving an electric motor for running with power of a charged battery (neither of them is shown). The vehicular air-conditioning unit 1 according to the present invention is also driven by battery power.

In detail, in an electric vehicle which cannot be heated by engine waste heat, the vehicular air-conditioning unit 1 in this embodiment performs heating by heat pump operation using a refrigerant circuit, and also selectively performs dehumidification/heating and cooling. The vehicle is not limited to an electric vehicle, and the present invention is also applicable to a hybrid vehicle which uses both an engine and an electric motor for running.

The vehicular air-conditioning unit 1 in this embodiment heats, ventilates, and air-conditions the vehicle interior of an electric vehicle. A refrigerant circuit R includes: an electric compressor 2 for compressing and pressurizing a refrigerant; a radiator 4 provided in a ventilation duct 3 of an HVAC unit 10 in which the air of the vehicle interior circulates, and for releasing, into the vehicle interior, heat from the high temperature and high pressure refrigerant discharged from the compressor 2; an electrically operated first expansion valve 6 for decompressing and expanding the refrigerant during heating; an external heat exchanger 7 for exchanging heat between the refrigerant and the outside air so as to function as a radiator during cooling and an evaporator during heating; an electrically operated second expansion valve 8 for decompressing and expanding the refrigerant; and an internal heat exchanger 9 provided in the ventilation duct 3 and for absorbing heat into the refrigerant from the vehicle interior and the outside during cooling and during dehumidification/heating, where these components are sequentially connected by a refrigerant pipe 11.

Moreover, a bypass path 12 is connected to bypass the expansion valve 6, a bypass path 13 is connected to bypass the expansion valve 6 and the external heat exchanger 7, and a bypass path 14 is connected to bypass the expansion valve 8 and the internal heat exchanger 9. A solenoid valve 16 that communicates with the bypass path 12 during cooling to cause the refrigerant to flow bypassing the expansion valve 6 is placed in the bypass path 12. A solenoid valve 17 that communicates with the bypass path 13 during dehumidification/heating to cause a part of the refrigerant to flow bypassing the expansion valve 6 and the external heat exchanger 7 is placed in the bypass path 13. A solenoid valve 18 that communicates with the bypass path 14 during heating and during dehumidification/heating to cause the refrigerant to flow bypassing the expansion valve 8 and the internal heat exchanger 9 is placed in the bypass path 14. A solenoid valve 19 that communicates with the refrigerant pipe 11 during cooling to cause the refrigerant to flow to the expansion valve 8 and the internal heat exchanger 9 is placed in the refrigerant pipe 11 between the branch of the bypass path 13 on the external heat exchanger 7 side and the branch of the bypass path 14 on the external heat exchanger 7 side.

A ventilation heat exchanger circuit 21 branches from the refrigerant pipe 11 between the radiator 4 and the expansion valve 6, and is connected to the intermediate pressure part of the compressor 2. The ventilation heat exchanger circuit 21 is connected with, in order from upstream: an electrically operated third expansion valve 22 opened during heating and during dehumidification/heating; a ventilation heat exchanger 24 for, during heating and during dehumidification/heating, absorbing heat into the refrigerant from the air of the vehicle interior that flows to the outside through a ventilation duct 23 for discharging the air of the vehicle interior to the outside for ventilation; and a check valve 26. Here, the forward direction of the check valve 26 is the direction to the compressor 2. Though the air of the vehicle interior flows out of the ventilation duct 23 due to the pressure difference or the Venturi effect in the outside, a ventilation fan may be provided to forcibly discharge the air of the vehicle interior.

The ventilation heat exchanger circuit 21 constitutes an injection circuit of the compressor 2. The ventilation heat exchanger circuit 21 including the ventilation heat exchanger 24 contributes to an improved COP (coefficient of performance) in the heat pump operation of the vehicular air-conditioning unit 1. Temperature sensors 27 and 28 each of which is composed of a thermistor are attached to the refrigerant entrance and exit of the ventilation heat exchanger 24 so that the temperature of the refrigerant can be detected.

A hot gas cycle circuit 31 branches from the discharge side (high pressure part) of the compressor 2, and is connected to the refrigerant pipe 11 on the refrigerant entrance side of the expansion valve 8. A solenoid valve 32 opened when the internal heat exchanger 9 performs heating in the case where the external heat exchanger 7 is clogged and needs to be defrosted is placed in the hot gas cycle circuit 31.

A bypass path 33 is connected between the upstream side of the check valve 26 of the ventilation heat exchanger circuit 21 and the low pressure part (suction side) of the compressor 2. A solenoid valve 34 opened when the refrigerant from the ventilation heat exchanger 24 is sucked into the low pressure part (suction side) of the compressor 2 is placed in the bypass path 33.

The ventilation duct 3 is provided with an inside/outside air switching damper 36 for switching the air introduced into the vehicle interior between the inside air which is the air of the vehicle interior and the outside air which is the air outside the vehicle. The ventilation duct 3 is also provided with a ventilation fan 37 for delivering the introduced inside air or outside air to the ventilation duct 3. The ventilation duct 3 is further provided with an air mix damper 38 for regulating the-degree of circulation of the inside air or the outside air through the radiator 4. An electric heater 44 is disposed in the ventilation duct 3 on the ventilation air downstream side of the radiator 4.

The low pressure part (suction side) of the compressor 2 is provided with a pressure sensor 39 for detecting the suction pressure of the compressor 2. The external heat exchanger 7 is provided with an external heat exchanger fan 41 for ventilating the external heat exchanger 7 with the outside air, and a temperature sensor 42 for detecting the outside air temperature.

A controller (ECU) 43 includes a microcomputer. The controller receives the outputs of the temperature sensors 27, 28, and 42 and the pressure sensor 39, and is connected with various switches such as an air-conditioning start switch (not shown) for starting the compressor 2, the ventilation fan 37, and the like. Though not shown, each of the external heat exchanger 7 and the ventilation heat exchanger 24 has attached thereto a temperature sensor for detecting the surface temperature of the heat exchanger, and these temperature sensors are also connected to the input of the controller 43. Devices such as the compressor 2, the expansion valves 6, 8, and 22 the solenoid valves 16, 17, 19, 32, and 34, the inside/outside air switching damper 36, the ventilation fan 37, the air mix damper 38, the external heat exchanger fan 41, and the electric heater 44 are connected to the output of the controller 43.

The following describes the operation of the vehicular air-conditioning unit 1 by the controller 43 in this embodiment with the above-mentioned structure. In the drawings, each valve shown in white is open, and each valve shown in black is closed. Likewise, the electric heater 44 shown in white is not energized, and the electric heater 44 shown in black is energized.

(Heating)

FIG. 1 shows the state during heating. In the case of heating the vehicle interior, the controller 43 operates the compressor 2, the ventilation fan 37, and the external heat exchanger fan 41, opens the solenoid valve 18, and closes the solenoid valves 16, 17, 19, 32, and 34. The controller 43 also performs control of decompressing the refrigerant by the expansion valves 6 and 22, while the air mix damper 38 closes the ventilation duct 3 other than the radiator 4. As a result, as indicated by the thick line in FIG. 1, the refrigerant flows through the compressor 2, the radiator 4, the expansion valve 6, and the external heat exchanger 7, and then flows through the solenoid valve 18 and the bypass path 14 and is sucked into the low pressure part of the compressor 2. The refrigerant is also circulated through the ventilation heat exchanger circuit 21. The vehicle interior is thus heated by the radiator 4.

In this case, a part of the refrigerant having passed through the radiator 4 flows into the ventilation heat exchanger circuit 21, and is decompressed in the expansion valve 22 and evaporated in the ventilation heat exchanger 24. Hence, the refrigerant absolves heat from the warm air of the vehicle interior flowing to the outside through the ventilation duct 23. The refrigerant in a liquid state or a gas-liquid two-phase state flowing into the ventilation heat exchanger 24 is heated by the air of the vehicle interior and vaporized. The controller 43 controls the valve opening of the expansion valve 22 based on the temperature difference between the inflow refrigerant and the outflow refrigerant detected by the temperature sensors 27 and 28, and accordingly the refrigerant passing through the ventilation heat exchanger circuit 21 is substantially completely vaporized before flowing into the intermediate pressure part of the compressor 2. In other words, the controller 43 regulates the valve opening of the expansion valve 22 so that the refrigerant supplied to the intermediate pressure part of the compressor 2 is in a superheated condition.

Thus, the refrigerant is vaporized in the ventilation heat exchanger 24 while drawing and recovering heat from the air of the vehicle interior discharged to the outside, and the sufficiently vaporized refrigerant is supplied to the intermediate pressure part of the compressor 2. This improves the heating capacity and the COP. The quantity of heat recovered by the ventilation heat exchanger 24 includes the quantity of heat of sunlight and the like entering through the vehicle windows, which further improves the heating effect. Therefore, even when the vehicle is an electric vehicle (EV), the battery power consumption by the vehicular air-conditioning unit 1 can be reduced to effectively prevent a decrease in cruising range. In the case where the temperature of the air discharged from the vehicle interior is a predetermined temperature (below freezing), the expansion valve 22 may be completely closed to disable the ventilation heat exchanger circuit 21.

In the case where the vehicle interior temperature (vehicle interior air temperature) is low, the refrigerant temperature in the ventilation heat exchanger 24 is low, incurring the risk that the pressure is less than or equal to the intermediate pressure part of the compressor 2. Accordingly, in the case where the vehicle interior air temperature is very low, e.g. below freezing (less than or equal to 0° C.), such as when starting the vehicle, the controller 43 opens the solenoid valve 34 in the bypass path 33 so that the refrigerant from the ventilation heat exchanger 24 is sucked into the low pressure part of the compressor 2. By doing so, the refrigerant having passed through the ventilation heat exchanger 24 can be smoothly sucked into the compressor 2 even in the above-mentioned situation.

(Determination of Need to Defrost the External Heat Exchanger 7 and the Ventilation Heat Exchanger 24)

During heating, water in the outside air or the air of the vehicle interior adheres to and forms frost on the external heat exchanger 7 or the ventilation heat exchanger 24 which is low in temperature due to the evaporation of the refrigerant. When frost grows and causes clogging, the heat exchange with the air becomes impossible, making it difficult to draw heat (heat pump). In view of this, the controller 43 determines the need to defrost the external heat exchanger 7 and the ventilation heat exchanger 24 on a regular basis (at predetermined time intervals).

In detail, the controller 43 detects the suction pressure (the pressure of the low pressure part) of the compressor 2 by the pressure sensor 39, in the state where she refrigerant flowing into the external heat exchanger 7 and the refrigerant flowing into the ventilation heat exchanger 24 are alternately (selectively) stopped by completely closing the expansion valve 6 and the expansion valve 22 alternately. In the case where the refrigerant is caused to flow through only the ventilation heat exchanger 24 without flowing through the external heat exchanger 7 and she hot gas cycle circuit 31 when determining the need to defrost she external heat exchanger 7, too, she controller 43 opens the solenoid valve 34 in the bypass path 33, to switch to the state in which the refrigerant evaporated in the ventilation heat exchanger 24 flows into not the intermediate pressure part but the low pressure part of the compressor 2. This allows the compressor 2 to smoothly perform the compression work.

In the case where the heat exchanger 7 or 24 is clogged with frost, the heat exchange with the air is not performed and so the evaporation temperature decreases. The controller 43 accordingly determines that the heat exchanger 7 or 24 needs to be defrosted in the case where the state in which the temperature computed by converting the suction pressure detected by the pressure sensor 39 is a predetermined low temperature (e.g. −10° C.) continues for a predetermined time (e.g. 10 minutes or more).

For example, in the case of determining the need to defrost the external heat exchanger 7, the expansion valve 22 is closed, and whether or not the external heat exchanger 7 is clogged with frost is determined by the pressure sensor 39 while the refrigerant is kept from flowing through the ventilation heat exchanger 24. In the case of determining the need to defrost the ventilation heat exchanger 24, the expansion valve 6 is closed, and whether or not the ventilation heat exchanger 24 is clogged with frost is determined by the pressure sensor 39 while the refrigerant is kept from flowing through the external heat exchanger 7. Thus, for each of the heat exchangers 7 and 24, whether or not the heat exchanger is clogged with frost and needs to be defrosted can be adequately determined using one pressure sensor 39.

The determination of the need to defrost each of the heat exchangers 7 and 24 is not limited to such. The determination may be made by directly detecting the decrease in surface temperature of each of the heat exchangers 7 and 24. The determination may also be made by detecting the increase in difference between the air temperature (the outside air temperature or the vehicle interior air temperature) and the evaporation temperature, or detecting the speed of air passing through each of the heat exchangers 7 and 24 by an air speed sensor and detecting the decrease in air speed.

(Defrosting of the External Heat Exchanger 7)

Figure 2:
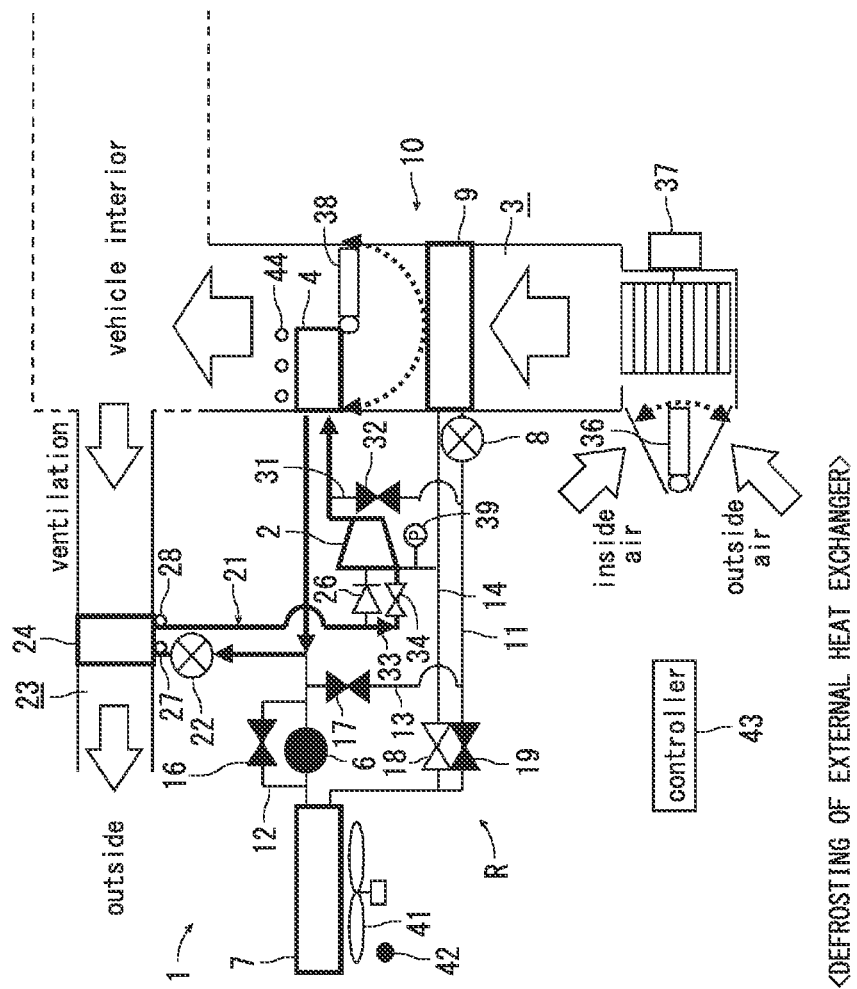
FIG. 2 is a diagram for describing the state during defrosting of an external heat exchanger in the vehicular air-conditioning unit in FIG. 1.

In the case of determining that the external heat exchanger 7 is clogged with frost and needs to be defrosted, the controller 43 switches from the state in FIG. 1, and completely closes the expansion valve 6 to keep the refrigerant from flowing through the external heat exchanger 7 and also opens the solenoid valve 34 (the solenoid valve 32 is closed), as shown in FIG. 2. This suppresses the evaporation of the refrigerant in the external heat exchanger 7, so that the frost on the external heat exchanger 7 is melted by the ventilation outside air and removed.

During the defrosting of the external heat exchanger 7, the high temperature refrigerant discharged from the compressor 2 releases heat in the radiator 4, evaporates in the ventilation heat exchanger 24, and is then sucked into the low pressure part of the compressor 2 through the solenoid valve 34. Heat drawn by the ventilation heat exchanger 24 is released by the radiator 4, to continuously heat the vehicle interior. Since the solenoid valve 32 is closed to keep the refrigerant from flowing through the hot gas cycle circuit 31, the refrigerant flows through only the ventilation heat exchanger 24. In this case, too, the controller 43 opens the solenoid valve 34 in the bypass path 33 to switch to the state in which the refrigerant evaporated in the ventilation heat exchanger 24 flows into not the intermediate pressure part but the low pressure part of the compressor 2. This allows the compressor 2 to smoothly perform the compression work.

In the case where the temperature sensor for detecting she surface temperature of the external heat exchanger detects a predetermined temperature above freezing, e.g. +3° C., for a predetermined time or more, the controller 43 determines that the defrosting of the external heat exchanger 7 is completed, and returns to the state in FIG. 1.

(Defrosting of the Ventilation Heat Exchanger 24)

Figure 3:
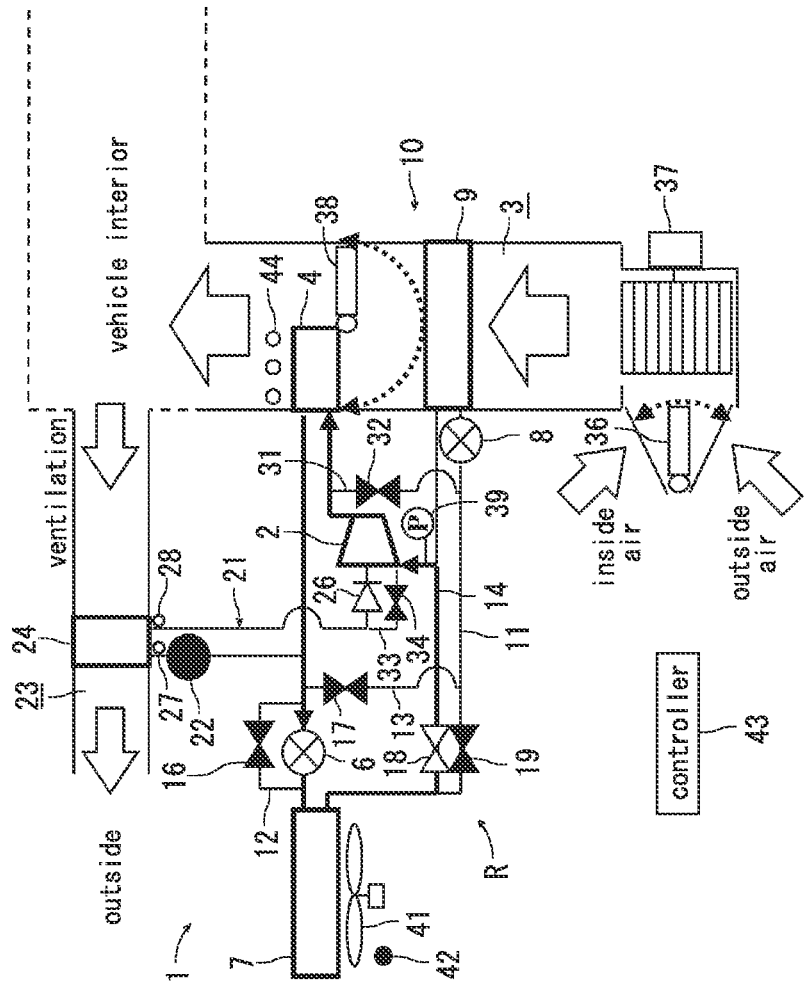
FIG. 3 is a diagram for describing the state during defrosting of a ventilation heat exchanger in the vehicular air-conditioning unit in FIG. 1.

In the case of determining that the ventilation heat exchanger 24 is clogged with frost, the controller 43 switches from the state in FIG. 1, and completely closes the expansion valve 22 to keep the refrigerant from flowing through the ventilation heat exchanger 24 as shown in FIG. 3. This suppresses the evaporation of the refrigerant in the ventilation heat exchanger 24, so that the frost on the ventilation heat exchanger 24 is melted by the ventilation air of the vehicle interior and removed.

During the defrosting of the ventilation heat exchanger 24, the recovery of heat from the air of the vehicle interior is stopped. In the case where the temperature sensor for detecting the surface temperature of the ventilation heat exchanger 24 detects a predetermined temperature above freezing, e.g. +3° C., for a predetermined time or more, the controller 43 determines that the defrosting of the ventilation heat exchanger 24 is completed, and returns to the state in FIG. 1.

In the case of determining that both of the external heat exchanger 7 and the ventilation heat exchanger 24 need to be defrosted, the controller 43 first defrosts one heat exchanger and then defrosts the other heat exchanger. For example, the controller 43 first defrosts the external heat exchanger 7 which is the main heating function and, after the defrosting ends, defrosts the ventilation heat exchanger 24.

(Defrosting of the External Heat Exchanger 7 During Heating, and Heating by the Internal Heat Exchanger 9)

In a very low outside air temperature environment where the outside air temperature is below freezing or the like, even when the expansion valve 6 is completely closed to keep the refrigerant from flowing through the external heat exchanger 7, frost is unlikely to be melted by outside air ventilation. In such a case, if the circuit is switched to the state in FIG. 2, the controller 43 cannot return to the state in FIG. 1 or requires a very long time before returning to the state in FIG. 1. During this, only the heat drawn by the ventilation heat exchanger 24 is released by the radiator 4 as mentioned above, and so the decreased heating capacity state continues long.

Figure 4:
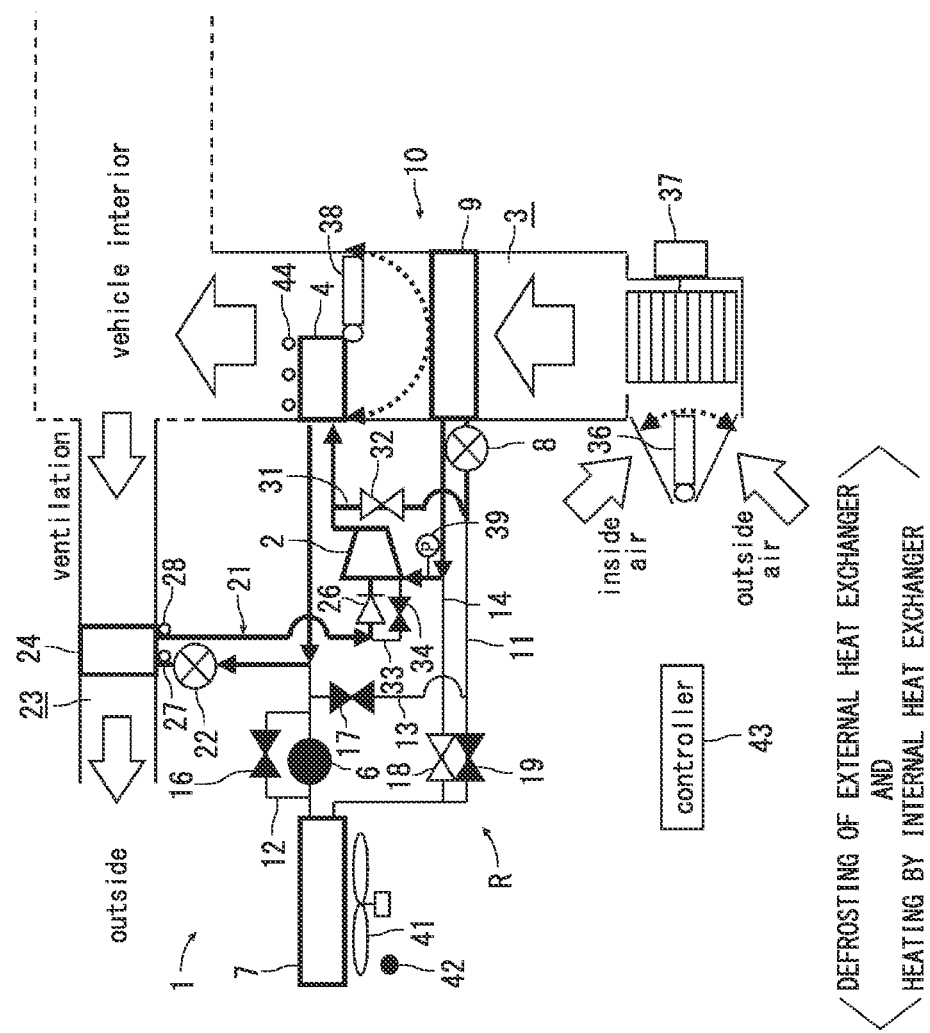
FIG. 4 is a diagram for describing the state of performing heating by an internal heat exchanger while defrosting the external heat exchanger in the vehicular air-conditioning unit in FIG. 1.

Accordingly, in the case where the controller 43 determines that the external heat exchanger 7 is clogged with frost and needs to be defrosted as mentioned above and also the outside air temperature detected by the temperature sensor 42 is a predetermined low value such as below freezing (less than or equal to 0° C.), the controller 43 switches the circuit from the state in FIG. 1 (or FIG. 2) to the state in FIG. 4. In FIG. 4, the controller 43 completely closes the expansion valve 6 to keep the refrigerant from flowing through the external heat exchanger 7, and also closes the solenoid valve 34 and opens the solenoid valve 32.

When the solenoid valve 32 is open, a part of the high temperature refrigerant discharged from the compressor 2 flows into the hot gas cycle circuit 31 and is decompressed in the expansion valve 8, then flows into the internal heat exchanger 9 to release heat, and is sucked into the low pressure part of the compressor 2. The rest of the high temperature refrigerant discharged from the compressor 2 releases heat in the radiator 4, evaporates in the ventilation heat exchanger 24, and is sucked into the intermediate pressure part of the compressor 2 through the check valve 26, as in FIG. 1.

Figure 5:
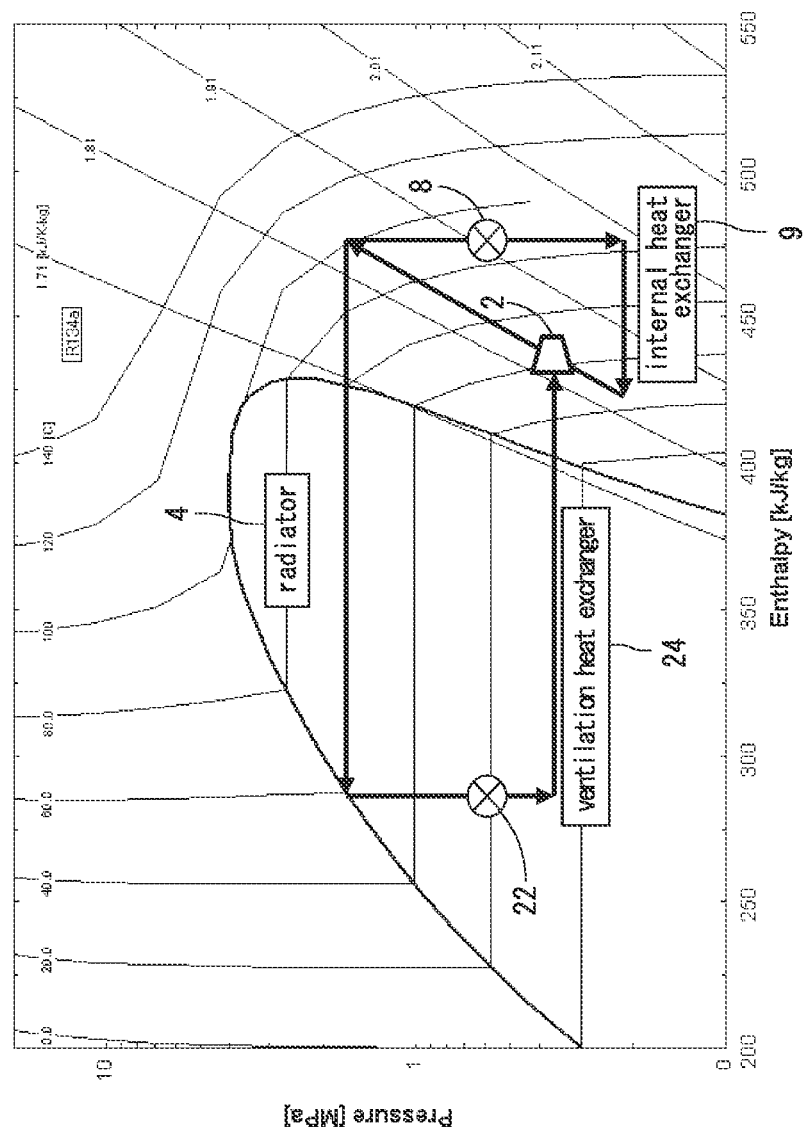
FIG. 5 is a p-h diagram of the vehicular air-conditioning unit in the case of FIG. 4.

In this way, the vehicle interior is heated by not only the heat release from the radiator 4 but also the heat release from the internal heat exchanger 9 to which the high temperature refrigerant is circulated through the hot gas cycle circuit 31. This state is explained with reference to the p-h diagram in FIG. 5. In FIG. 5, the same reference numerals as in FIG. 4 denote the same functions. The high temperature refrigerant compressed and pressurized in the compressor 2 releases heat in the radiator 4. The upper side from top right to left in FIG. 5 indicates the heat release in the radiator 4. After this, the refrigerant is decompressed in the expansion valve 22, as a result of which the pressure decreases to the intermediate pressure. The left side from top to bottom in FIG. 5 indicates the decompression in the expansion valve 22. The refrigerant then flows into the ventilation heat exchanger 24 and evaporates, and is sucked into the intermediate pressure part of the compressor 2. The lower left side from bottom left to right in FIG. 5 indicates the heat absorption in the ventilation heat exchanger 24.

Meanwhile, a part of the high temperature refrigerant pressurized in the compressor 2 flows into the hot gas cycle circuit 31 and is decompressed in the expansion valve 8, as a result of which the pressure decreases to the low pressure. The right side from top right to bottom in FIG. 5 indicates the decompression in the expansion valve 8. The refrigerant then flows into the internal heat exchanger 9 and evaporates, and is sucked into the low pressure part of the compressor 2. The lower right side from bottom right to left in FIG. 5 indicates the heat release in the internal heat exchanger 9. Since the heat release that combines the upper side and the lower right side in FIG. 5 (actually the flow amounts are multiplied) corresponds to the heating capacity, the heating capacity is high as compared with de case of using only the radiator 4 as in FIG. 2 (only the upper side in FIG. 5).

Heat can thus be released by the internal heat exchanger 9 into the vehicle interior to thereby heat the vehicle interior, in addition to the heating by the radiator 4. While the radiator 4 and the internal heat exchanger 9 heat the vehicle interior, the ventilation heat exchanger 24 can draw and recover heat from the air of the vehicle interior discharged to the outside. Therefore, the vehicle interior can be heated very effectively and efficiently by heat pump operation in a low outside air temperature environment. Particularly in an electric vehicle in which the compressor 2 is driven by a battery, excellent vehicle interior air-conditioning can be realized without a decrease in cruising range.

In the case where the temperature sensor for detecting the surface temperature of the external heat exchanger 7 detects a predetermined temperature above freezing, e.g. +3° C., for a predetermined time or more, the controller 43 determines that the defrosting of the external heat exchanger 7 is completed and returns to the state in FIG. 1, as mentioned above. In the case where the outside air temperature is below freezing (less than or equal to 0° C.), however, frost on the external heat exchanger 7 is unlikely to be melted by outside air ventilation. Accordingly, in the case where the outside air temperature detected by the temperature sensor 42 is below freezing, the controller 43 does not determine whether or not the defrosting of the external heat exchanger 7 is completed. The control operation by the controller 43 can be simplified by avoiding the needless defrosting completion determination in a situation where defrosting the external heat exchanger 7 by the outside air is difficult.

In the embodiment described above, the high temperature refrigerant is caused to flow through the hot gas cycle circuit 31 in the case where the external heat exchanger 7 is to be defrosted and the outside air temperature is low. However, this is not a limit, and the high temperature refrigerant may be always caused to flow through the hot gas cycle circuit 31 as in FIG. 4 in the case where the external heat exchanger 7 is to be defrosted. In such a case, the external heat exchanger can be simultaneously defrosted by outside air ventilation, in a situation where the outside air temperature is above freezing.

Drawing heat by the external heat exchanger 7 is likely to be difficult in the case where the outside air temperature drops to a predetermined low value such as below freezing. In such a low outside air temperature environment, the circuit may be switched from the state in FIG. 1 to the state in FIG. 4 regardless of whether or not the external heat exchanger 7 needs to be defrosted.

(Supplemental Heating by the Electric Heater 44)

In the case where the temperature of the vehicle interior is still low even when heated by the heat release from the radiator 4 and the internal heat exchanger 9 in the above-mentioned manner, the controller 43 energizes the electric heater 44 to generate heat, to assist in heating the vehicle interior. For example, in the case where the temperature of the vehicle interior does not increase to a set temperature even after the above-mentioned operation during heating is continuously performed for a predetermined time, the controller 43 performs control of causing the electric heater 44 to generate heat and, once the temperature has increased to the set temperature, stopping the energization. The capacity of heating the vehicle interior is supplemented by the electric heater 44, which creates a more comfortable vehicle interior environment. Here, the electric heater 44 is energized within the allowable range of the battery of de electric vehicle.

(Dehumidification/Heating)

Figure 6:
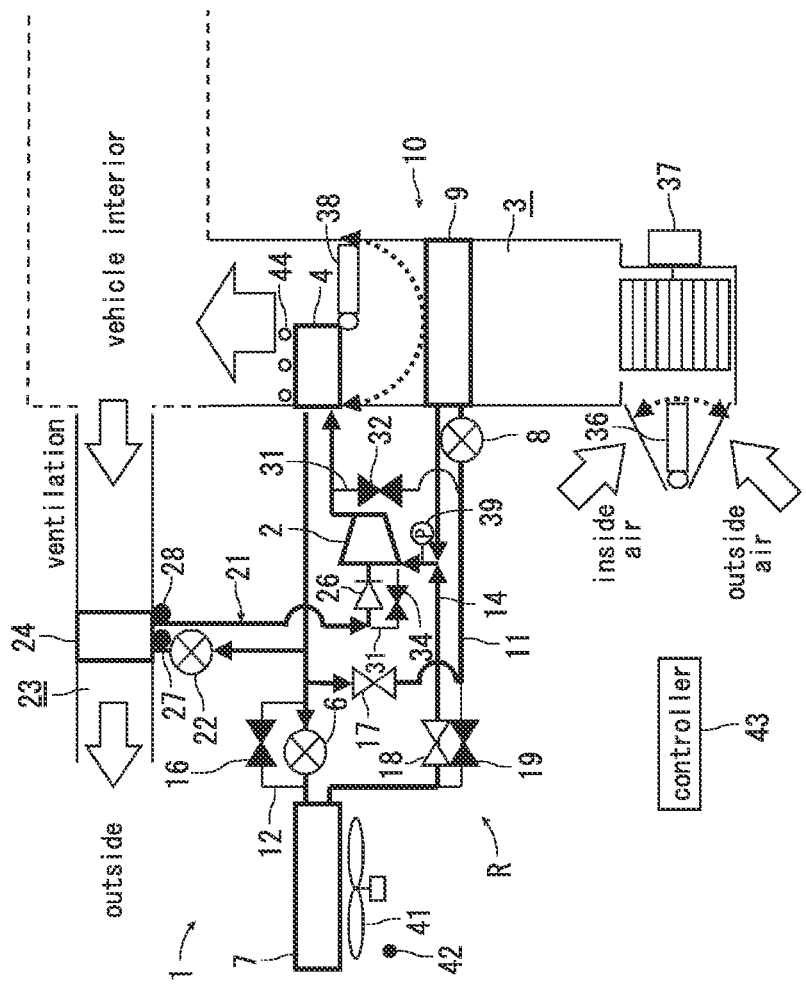
FIG. 6 is a diagram for describing the state during dehumidification/heating of the vehicular air-conditioning unit in FIG. 1.

FIG. 6 shows the state during dehumidification/heating. In the case of dehumidifying/heating the vehicle interior during the rainy season with low temperature, when the vehicle windows are fogged, or the like, the controller 43 operates the compressor 2, the ventilation fan 37, and the external heat exchanger an 41, opens the solenoid valves 17 and 18, and closes the solenoid valves 16, 19, 32, and 34. The controller 43 also performs control of decompressing the refrigerant by the expansion valves 6, 8, and 22, while the air mix damper 38 closes the ventilation duct 3 other than the radiator 4. As a result, as indicated by the thick line in FIG. 6, the refrigerant flows through the compressor 2, the radiator 4, the expansion valve 6, and the external heat exchanger 7, and then flows through the solenoid valve 18 and the bypass path 14 and is sucked into the low pressure part of the compressor 2. Moreover, a part of the refrigerant having passed through the radiator 4 passes through the bypass path 13 with the solenoid valve 17, flows into the internal heat exchanger 9 through the expansion valve 8, and is sucked into the low pressure part of the compressor 2. The rest of the refrigerant having passed through the radiator 4 flows into the ventilation heat exchanger 24 through the expansion valve 22, and returns to the intermediate pressure part of the compressor 2. The vehicle interior is thus dehumidified/heated by the cooling (dehumidification) by the internal heat exchanger 9 and the heating by the radiator 4 The heat recovery from the air of the vehicle interior by the ventilation heat exchanger 24 is carried out, too.

(Cooling)

Figure 7:
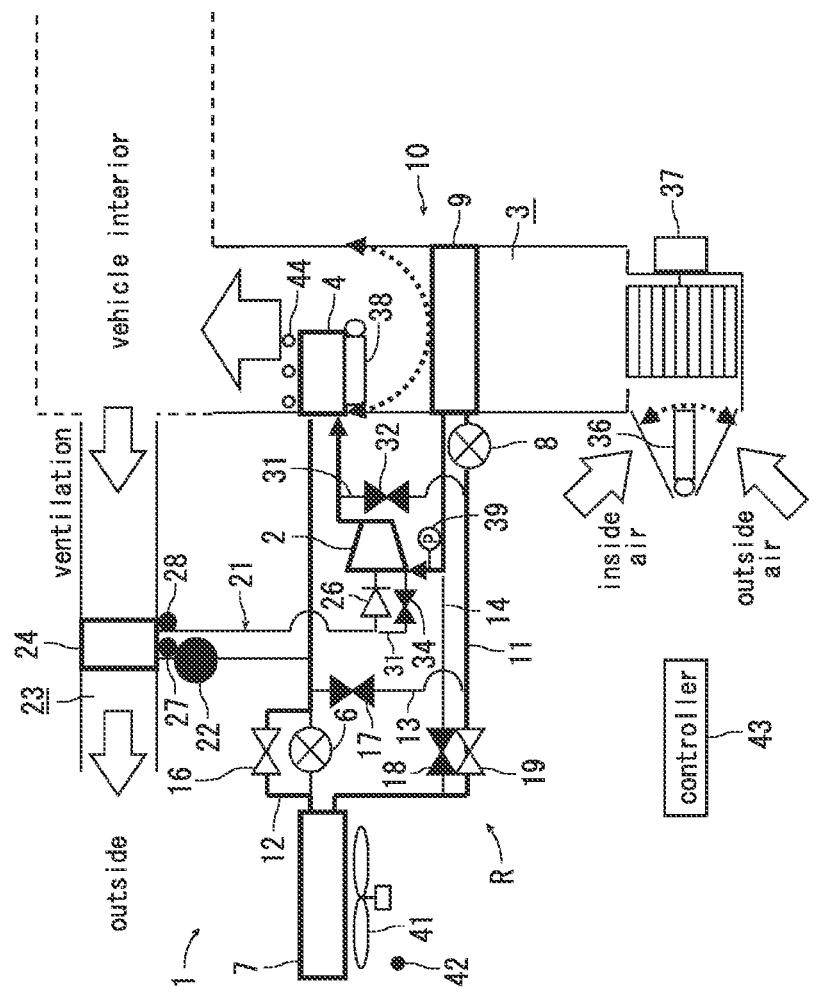
FIG. 7 is a diagram for describing the state during cooling of the vehicular air-conditioning unit in FIG. 1.

FIG. 7 shows the state during cooling. In the case of cooling the vehicle interior, the controller 43 operates the compressor 2, the ventilation fan 37, and the external heat exchanger fan 41, opens the solenoid valves 16 and 19, and closes the solenoid valves 17, 18, 32, and 34. The controller 43 also completely closes the expansion valve 22 and performs control of decompressing the refrigerant by the expansion valve 8, while the air mix damper 38 closes the upstream side of the radiator 4 so that the air of the vehicle interior passes through the ventilation duct 3 other than the radiator 4. As a result, as indicated by the thick line in FIG. 7, the refrigerant flows through the compressor 2, the radiator 4, the solenoid valve 16, and the external heat exchanger 7, and then flows through the solenoid valve 19 and is decompressed in the expansion valve 8. After this, the refrigerant flows into the internal heat exchanger 9 and evaporates, and is sucked into the low pressure part of the compressor 2. The vehicle interior is cooled by this heat absorption action by the internal heat exchanger 9. Meanwhile, the ventilation heat exchanger 24 is not in operation.

Embodiment 2

Figure 8:
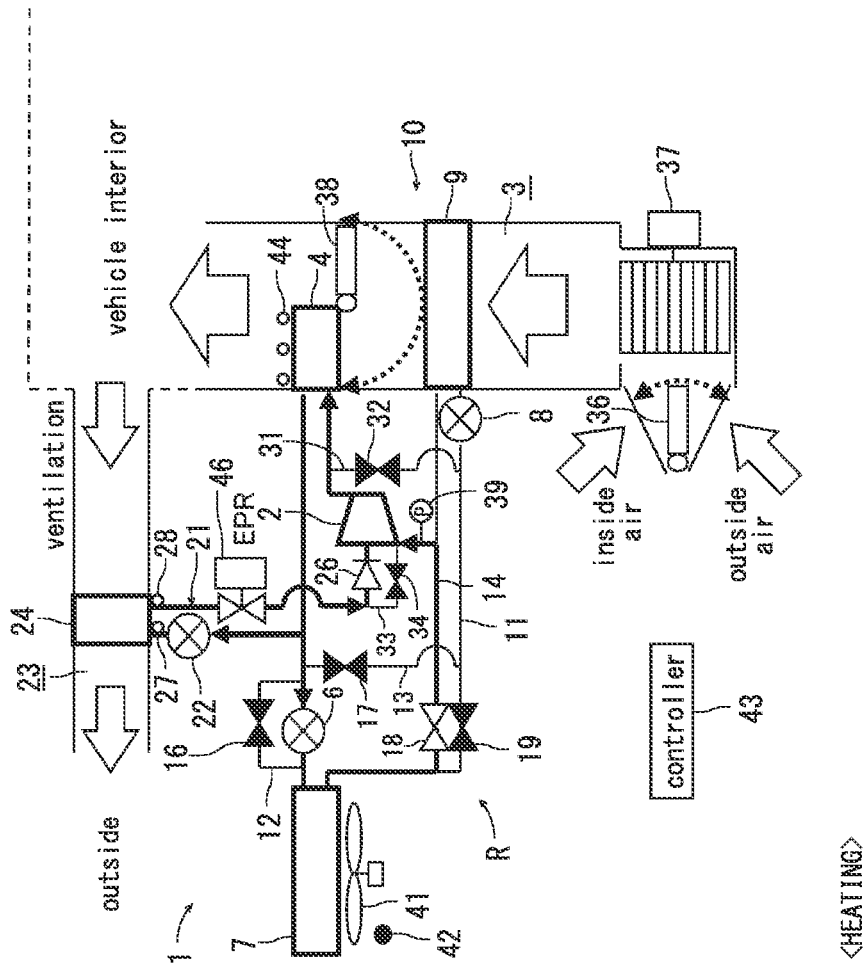
FIG. 8 is a diagram for describing the state during heating of a vehicular air-conditioning unit in another embodiment to which the present invention is applied (Embodiment 2).

FIG. 8 shows the state during heating of the vehicular air-conditioning unit 1 in another embodiment to which the present invention is applied in FIG. 8, the same reference numerals as in FIG. 1 denote the same functions. In Embodiment 2, an evaporation pressure regulation valve (EPR) 46 is placed in the ventilation heat exchanger circuit 21 at the position after the refrigerant passes through the ventilation heat exchanger 24 and before the refrigerant reaches the compressor 2 (actually, upstream from the check valve 26 and the solenoid valve 34).

The evaporation pressure regulation valve 46 is a valve mechanism for regulating the evaporation pressure in the ventilation heat exchanger 24 so as to keep the evaporation temperature of the refrigerant in the ventilation heat exchanger 24 from dropping below freezing (less than or equal to 0° C.) By providing the evaporation pressure regulation valve 46, the ventilation heat exchanger 24 can be maintained free of frost. Since the suspension of the function of the ventilation heat exchanger 24 for defrosting as mentioned above is prevented, the ventilation heat exchanger 24 can always recover heat from the air of the vehicle interior.

Embodiment 3

Figure 9:
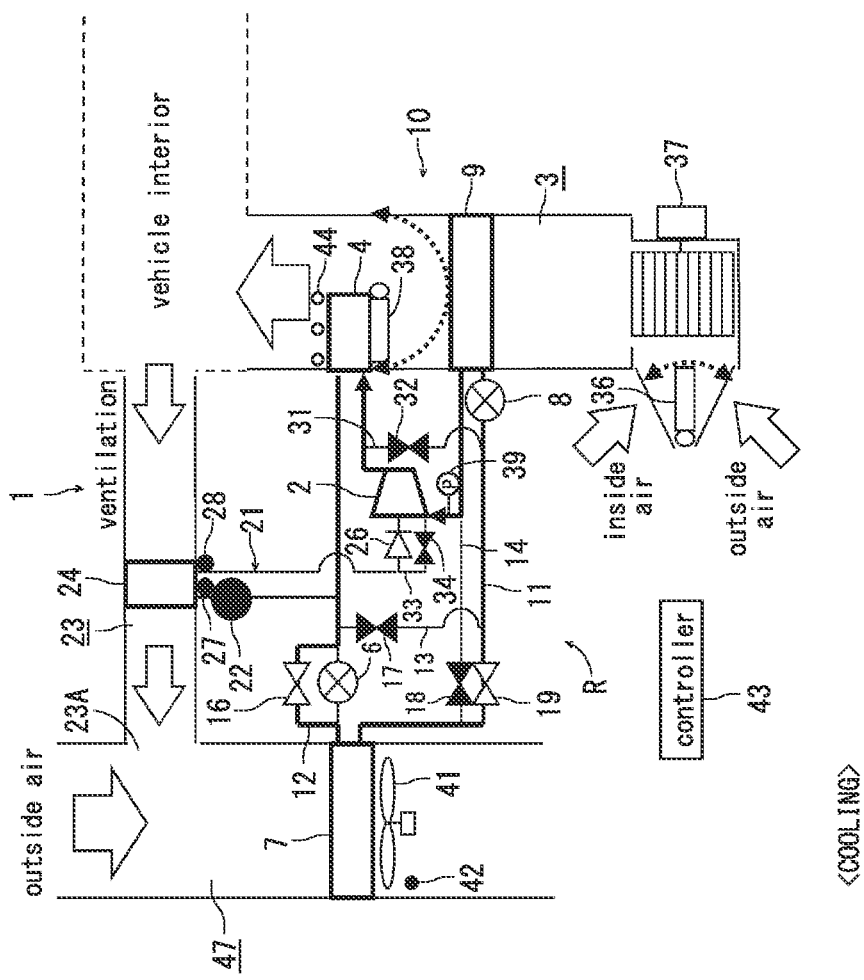
FIG. 9 is a diagram for describing the state during cooling of a vehicular air-conditioning unit in yet another embodiment to which the present invention is applied (Embodiment 3).

FIG. 9 shows the state during cooling of the vehicular air-conditioning unit 1 in yet another embodiment to which the present invention is applied. In FIG. 9, the same reference numerals as in FIGS. 1 and 7 denote the same functions. In Embodiment 3, the external heat exchanger 7 is located in an outside air duct 47 outside the vehicle through which the outside air flows, and an exit 23A of the ventilation duct 23 communicates with the outside air duct 47 on the upstream side of the outside air flowing into the external heat exchanger 7.

When the exit 23A of the ventilation duct 23 communicates with the outside air duct 47, the air of the vehicle interior is sucked out by the Venturi effect of the outside air flowing through the outside air duct 47. This eliminates the need to separately provide a ventilation fan in the ventilation duct 23. Besides, the air of the vehicle interior having passed through the ventilation heat exchanger 24 can be smoothly guided to the external heat exchanger 7. In such a case, the air of the vehicle interior having passed through the ventilation heat exchanger 24 mixes with the outside air on the upstream side of the external heat exchanger 7 and then flows through the external heat exchanger 7. Accordingly, during heating, the air of the vehicle air which is still higher in temperature than the outside air even after passing through the ventilation heat exchanger 24 can be caused to flow through the external heat exchanger 7 to increase the temperature of the outside air with which the external heat exchanger 7 is ventilated. The evaporation temperature of the refrigerant in the external heat exchanger 7 can thus be increased to reduce the power for the compressor 2.

During cooling, on the other hand, the air of the vehicle interior lower in temperature than the outside air can be caused to flow through the external heat exchanger 7 to decrease the temperature of the outside air with which the external heat exchanger 7 is ventilated. The condensation temperature can thus be decreased to equally reduce the power for the compressor 2.

Embodiment 4

Figure 10:
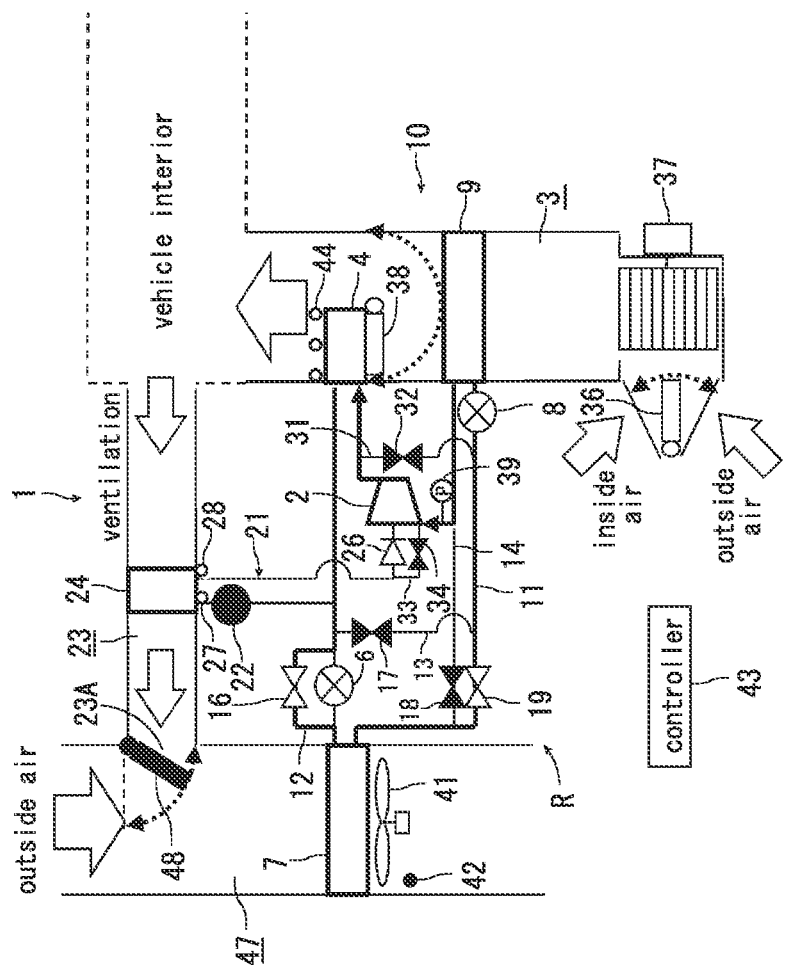
FIG. 10 is a diagram for describing the state during cooling of a vehicular air-conditioning unit in yet another embodiment to which the present invention is applied (Embodiment 4).

FIG. 10 shows the state during cooling of the vehicular air-conditioning unit 1 in yet another embodiment to which the present invention is applied. In FIG. 10, the same reference numerals as in FIG. 9 denote the same functions. In Embodiment 4, too, the external heat exchanger 7 is located in the outside air duct 47 in which the outside air is caused to flow through the external heat exchanger 7, and the exit 23A of the ventilation duct 23 communicates with the outside air duct 47 on the upstream side of the external heat exchanger 7. The exit 23A thus serves as the vehicle interior air inflow part. In Embodiment 4, an electric damper 48 is attached to the exit 23A serving as the inflow part.

The controller 43 controls the damper 48 to linearly regulate the opening of the exit 23A. As an example, narrowing the opening of the exit 23A (inflow part) by the damper 48 removes the drawback in that the air of the vehicle interior sucked out by the Venturi effect increases too much. For instance, the controller 43 computes the amount (speed) of outside air with which the external heat exchanger 7 is ventilated, from the vehicle speed and the rotation speed of the external heat exchanger fan 41. In the case where the amount of outside air with which the external heat exchanger 7 is ventilated is large, the controller 43 narrows the opening of the exit 23A by the damper 48 so that the exit 23A is almost closed. In the case where the amount of outside air with which the external heat exchanger 7 is ventilated is small, the controller 43 widens the opening by the damper 48. As a result, the amount of ventilation from the vehicle interior can be kept constant even when the amount of outside air with which the external heat exchanger 7 is ventilated changes due to, for example, a change in the vehicle speed or the rotation speed of the external heat exchanger fan 41.

Embodiment 5

Figure 11:
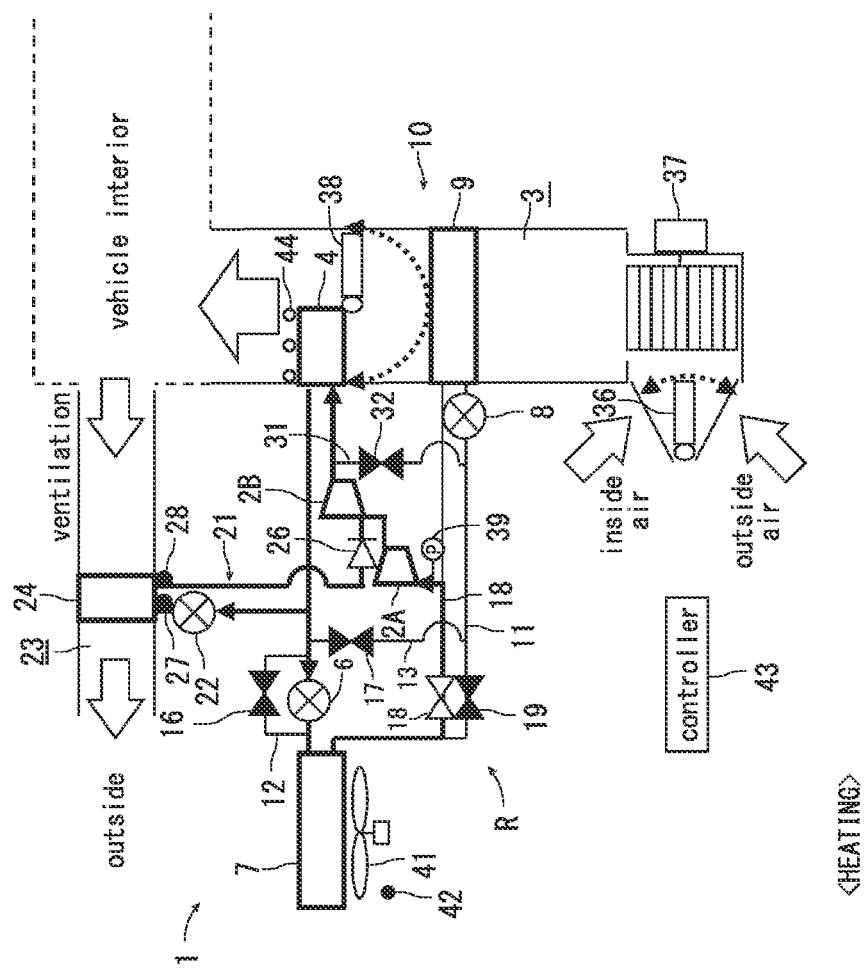
FIG. 11 is a diagram for describing the state during heating of a vehicular air-conditioning unit in yet another embodiment to which the present invention is applied (Embodiment 5).

FIG. 11 shows the state during heating of the vehicular air-conditioning unit 1 in yet another embodiment to which the present invention is applied. In FIG. 11, the same reference numerals as in FIG. 1 denote the same or similar functions. In Embodiment 5, two compressors 2A and 2B are used in the following structure: the refrigerant having passed through the external heat exchanger 7 or the internal heat exchanger 9 is sucked into the suction side (low pressure part) of the low-stage compressor 2A and compressed to the intermediate pressure in the low-stage compressor 2A, and the refrigerant of the intermediate pressure is sucked into the high-stage compressor 2B and the high temperature refrigerant compressed in the high-stage compressor 2B is discharged to the radiator 4.

In such a two-stage compression vehicular air-conditioning unit 1, the refrigerant having passed through the ventilation heat exchanger 24 passes through the check valve 26 and is sucked into the suction side of the high-stage compressor 2B at the intermediate pressure. In the case where the refrigerant is kept from flowing through any of the external heat exchanger 7 and the internal heat exchanger 9 as mentioned earlier, the low-stage compressor 2A may be stopped, or a bypass path and a solenoid valve may be connected to the suction side of the low-stage compressor 2A from the upstream side of the check valve 26 so that the refrigerant from the ventilation heat exchanger 24 is sucked into the low-stage compressor 2A by opening the solenoid valve.

Embodiment 6

Figure 12:
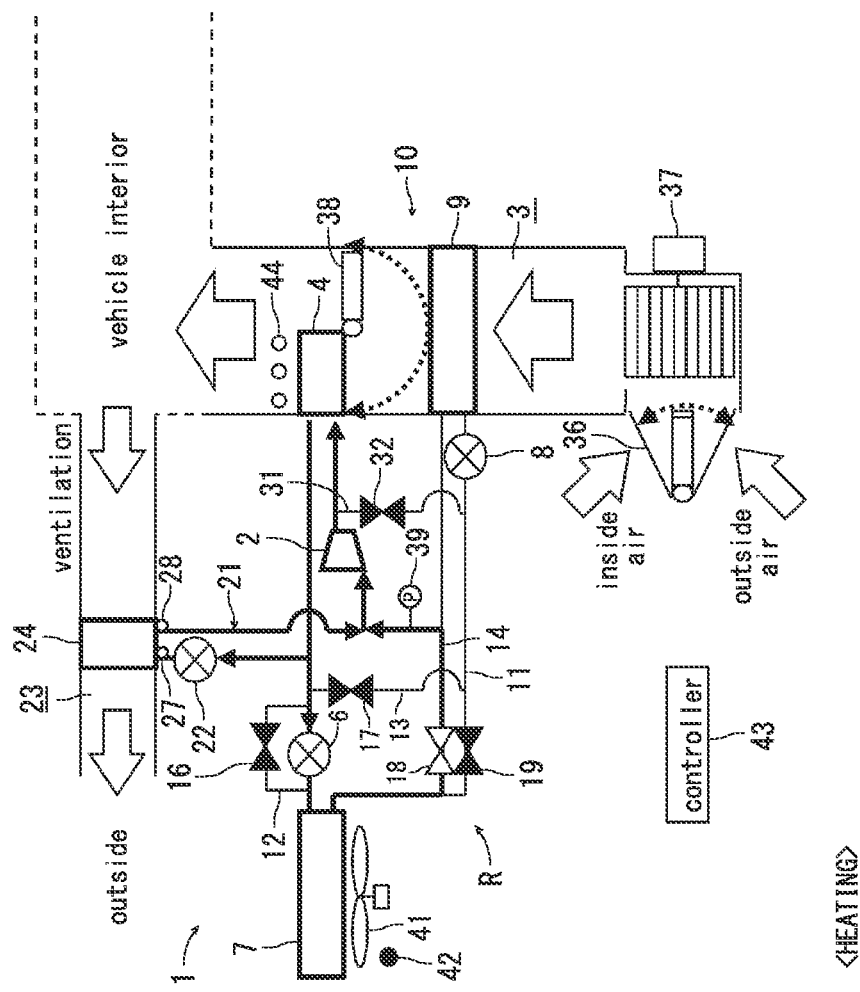
FIG. 12 is a diagram for describing the state during heating of a vehicular air-conditioning unit in yet another embodiment to which the present invention is applied (Embodiment 6).
Figure 13:
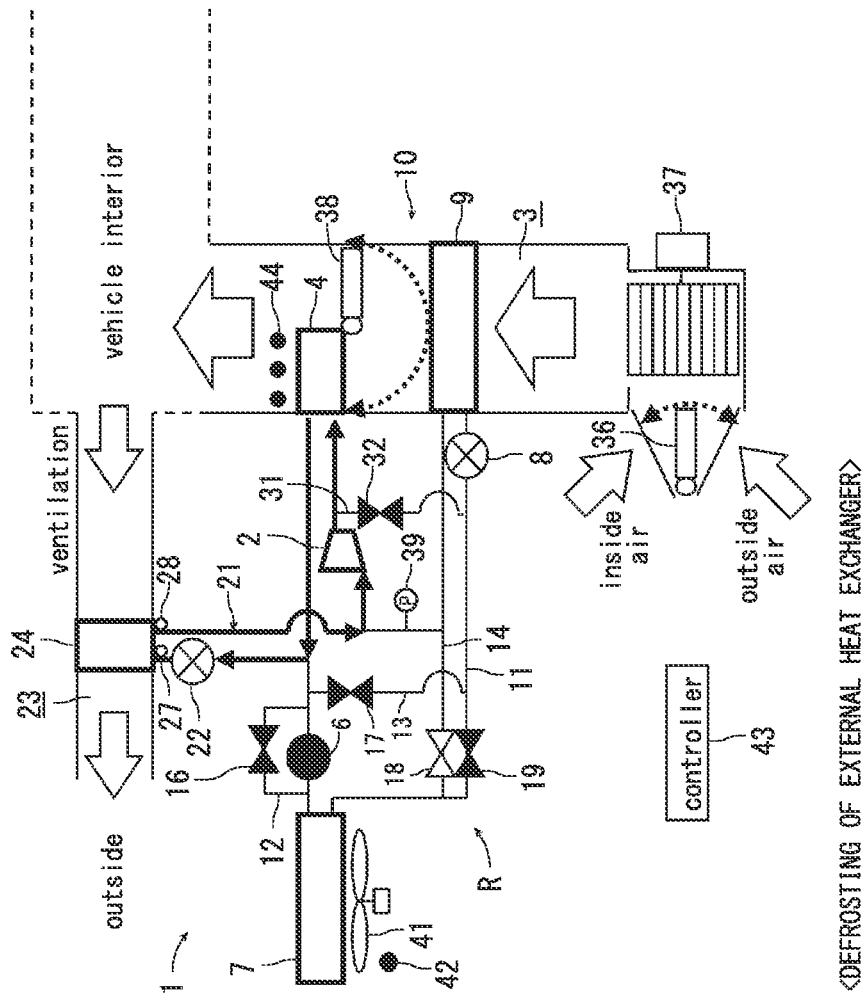
FIG. 13 is a diagram for describing the state during defrosting of an external heat exchanger in the vehicular air-conditioning unit in FIG. 12.
Figure 14:
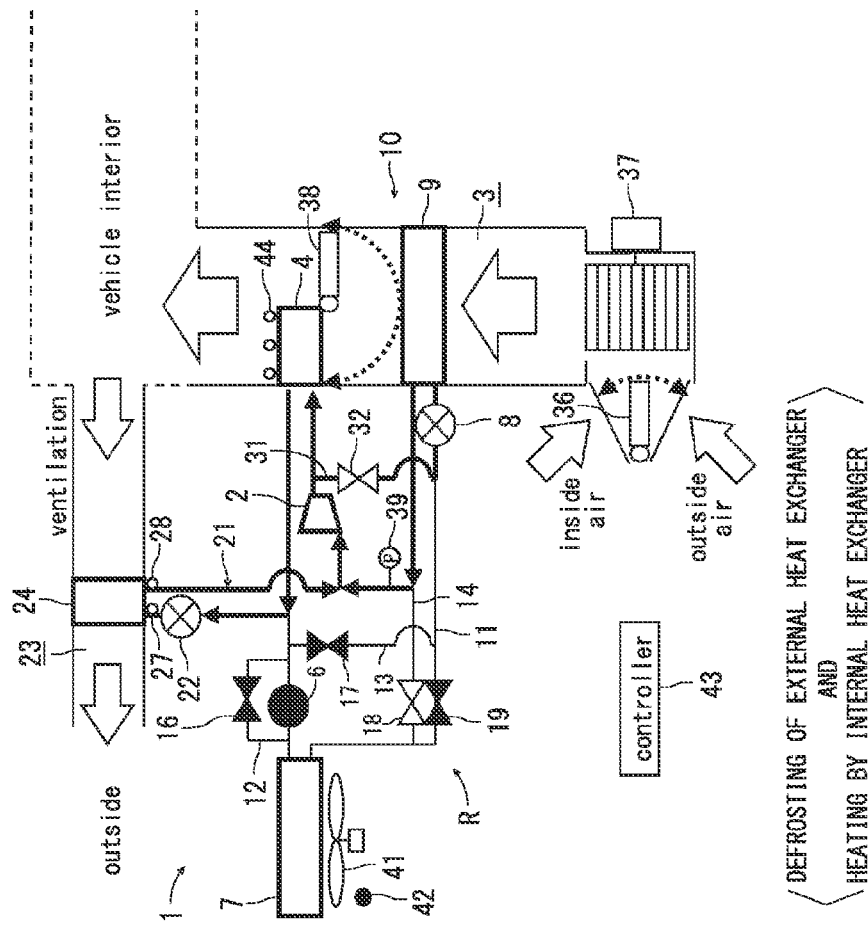
FIG. 14 is a diagram for describing the state of performing heating by an internal heat exchanger while defrosting the external heat exchanger in the vehicular air-conditioning unit in FIG. 12.
Figure 15:
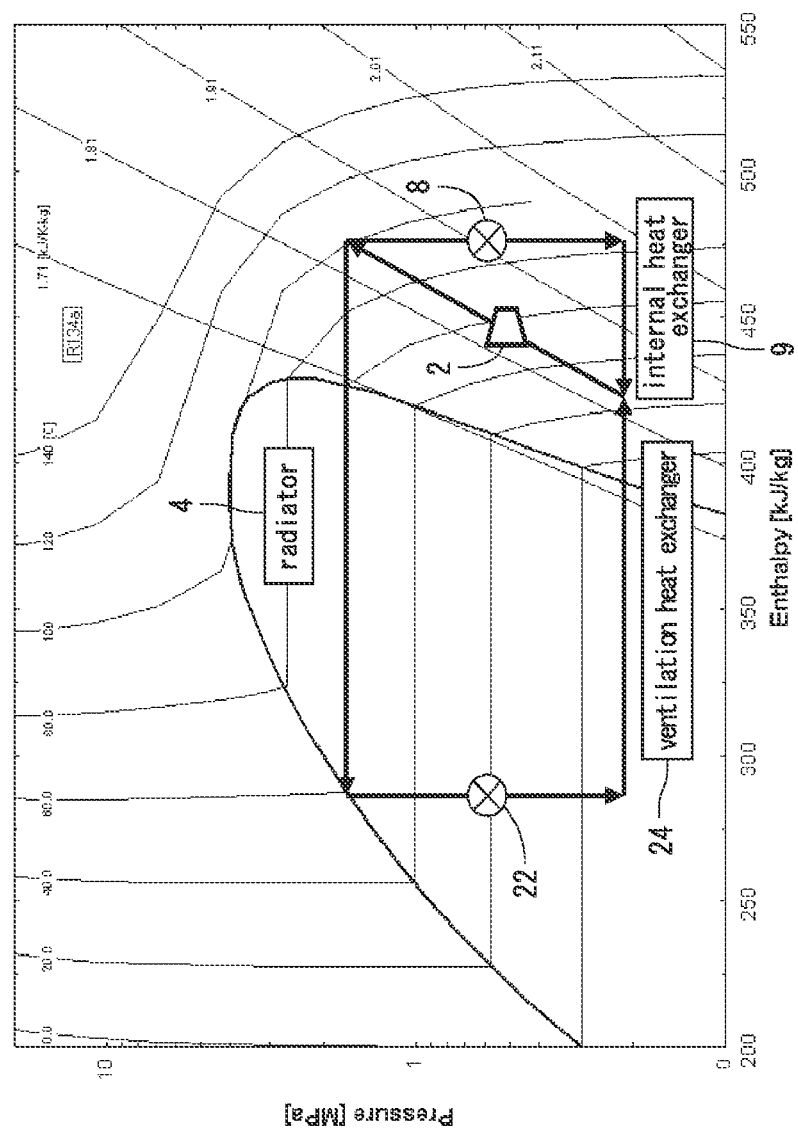
FIG. 15 is a p-h diagram of the vehicular air-conditioning unit in the case of FIG. 14.

FIGS. 12 to 15 are diagrams of the vehicular air-conditioning unit 1 in yet another embodiment to which the present invention is applied. FIG. 12 shows the state during heating of the vehicular air-conditioning unit 1 in Embodiment 6. FIG. 13 shows the state during defrosting of the external heat exchanger 7. FIG. 14 shows the state of performing heating by the internal heat exchanger 9 while defrosting the external heat exchanger. FIG. 15 is a p-h diagram in the case of FIG. 14. FIGS. 12 to 15 respectively correspond to FIGS. 1, 2, 4, and 5 in Embodiment 1. In FIGS. 12 to 15, the same reference numerals as in FIGS. 1, 2, 4, and 5 denote the same functions.

In Embodiment 6, the ventilation heat exchanger circuit 21 is connected to not the intermediate pressure part of the compressor 2 but the low pressure part of the compressor 2, and the check valve 26 and the solenoid valve 34 in Embodiment 1 are omitted. Accordingly, the refrigerant is decompressed to the low pressure in the expansion valve 22, evaporates in the ventilation heat exchanger 24, and joins she refrigerant from she external heat exchanger 7 or the internal heat exchanger 9 and is sucked into the suction side (low pressure part) of the compressor 2.

The injection effect of returning the refrigerant, which has passed through the ventilation heat exchanger 24, to she intermediate pressure part of the compressor 2 is not achieved in such a structure, unlike in Embodiment 1. However, the circuit structure is simplified because the check valve 26, the bypass path 33, and the solenoid valve 34 are unnecessary. Besides, the heat recovery by the ventilation heat exchanger 24 and the heating effect by the internal heat exchanger 9 can be equally achieved. This structure therefore has a cost advantage over Embodiment 1.

Embodiment 7

Figure 16:
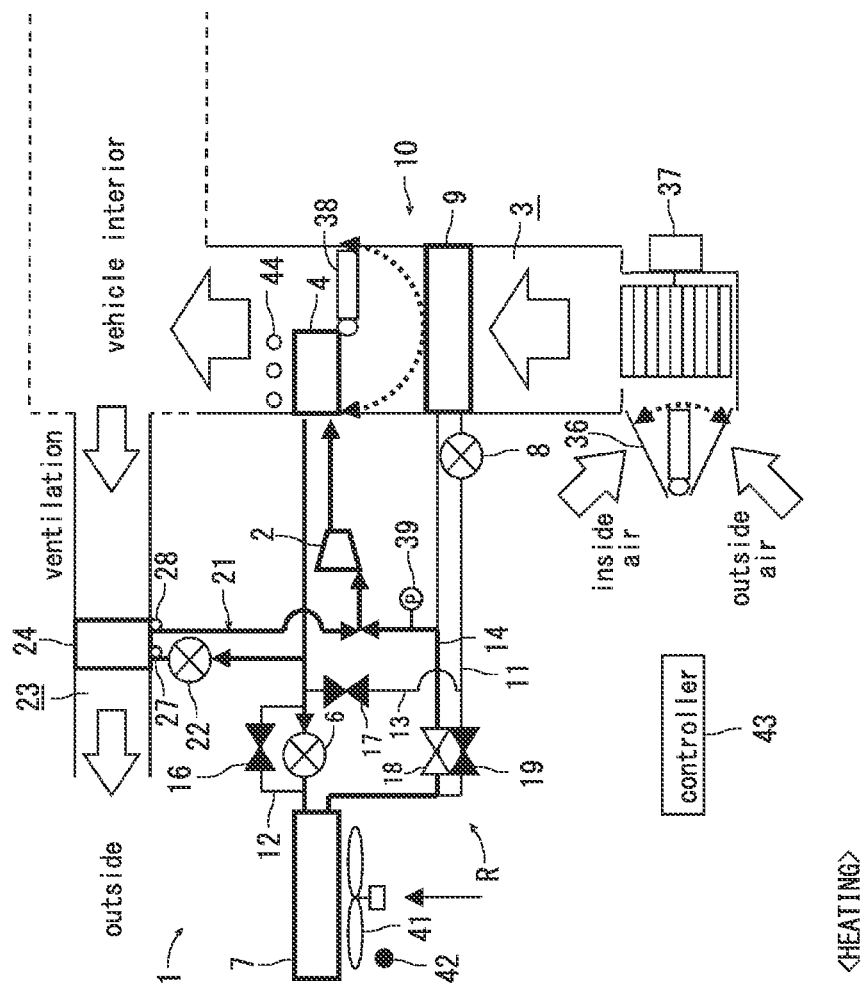
FIG. 16 is a diagram for describing the state during heating of a vehicular air-conditioning unit in yet another embodiment to which the present invention is applied (Embodiment 7).
Figure 17:
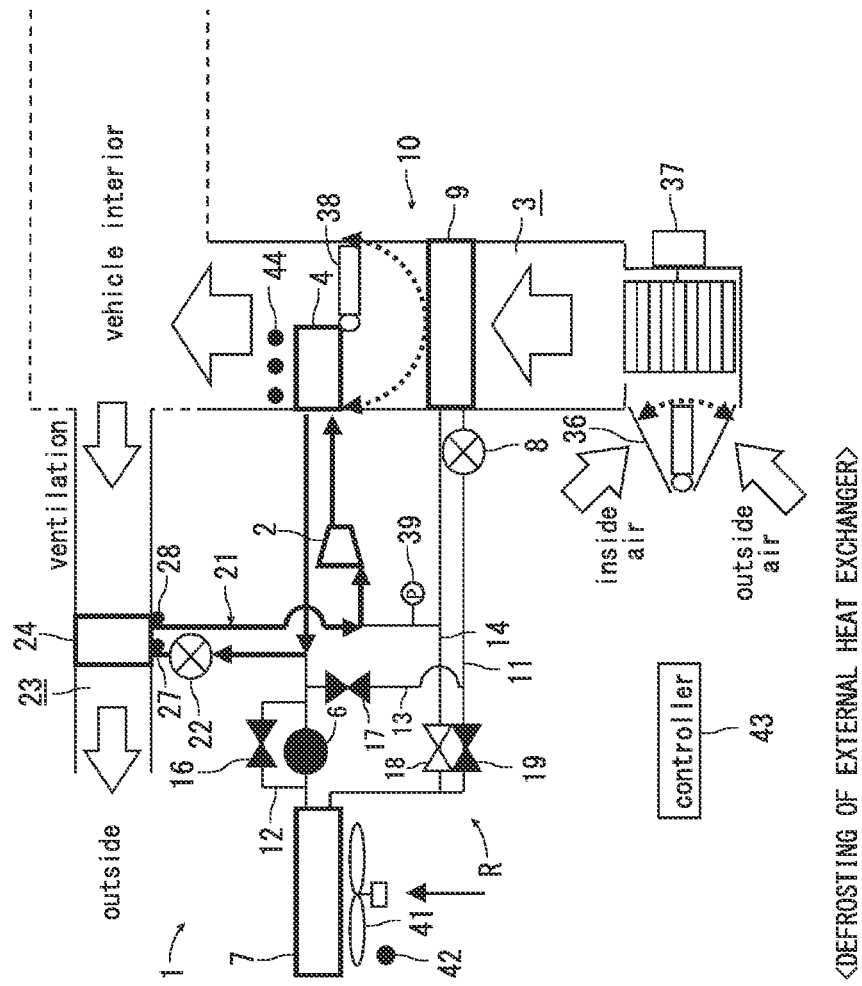
FIG. 17 is a diagram for describing the state during defrosting of an external heat exchanger in the vehicular air-conditioning unit in FIG. 16.

FIGS. 16 and 17 are diagrams of the vehicular air-conditioning unit 1 in yet another embodiment to which the present invention is applied. FIG. 16 shows the state during heating of the vehicular air-condoning unit 1 in Embodiment 7. FIG. 17 shows the state during defrosting of the external heat exchanger 7. FIGS. 16 and 17 respectively correspond to FIGS. 1 and 2 in Embodiment 1. In FIGS. 16 and 17, the same reference numerals as in FIGS. 1 and 2 denote the same or similar functions.

In Embodiment 7, the hot gas cycle circuit 31 and the solenoid valve 32 in Embodiment 1 are omitted. Moreover, the ventilation heat exchanger circuit 21 is connected to not she intermediate pressure part of the compressor 2 but the low pressure part of the compressor 2, and the check valve 26 and the solenoid valve 34 in Embodiment 1 are omitted. Accordingly, the refrigerant is decompressed to the low pressure in the expansion valve 22, evaporates in the ventilation heat exchanger 24, and joins the refrigerant from the external heat exchanger 7 and is sucked into the suction side (low pressure part) of the compressor 2. The other refrigerant flows are the same as those in FIG. 1 in Embodiment 1.

In the case of heating the vehicle interior, the controller 43 operates the compressor 2, the ventilation fan 37, and the external heat exchanger fan 41, opens the solenoid valve 18, and closes the solenoid valves 16, 17, and 19. The controller 43 also performs control of decompressing the refrigerant by the expansion valves 6 and 22, while the air mix damper 38 closes the ventilation duct 3 other than the radiator 4. As a result, as indicated by the thick line in FIG. 16, the refrigerant flows through the compressor 2, the radiator 4, the expansion valve 6, and the external heat exchanger 7, and then flows through the solenoid valve 18 and the bypass path 14 and is sucked into the low pressure part of the compressor 2. The refrigerant is also circulated through the ventilation heat exchanger circuit 21. The vehicle interior is thus heated by the radiator 4.

In this case, too, a part of the refrigerant having passed through the radiator 4 flows into the ventilation heat exchanger circuit 21, and is decompressed in the expansion valve 22 and evaporated in the ventilation heat exchanger 24. Hence, the refrigerant absolves heat from the warm air of the vehicle interior flowing to the outside through the ventilation duct 23.

When defrosting the external heat exchanger 7, the controller 43 switches from the state in FIG. 16, and completely closes the expansion valve 6 to keep the refrigerant from flowing through the external heat exchanger 7 as shown an FIG. 17. This suppresses the evaporation of the refrigerant in the external heat exchanger 7, so that the frost on the external heat exchanger 7 is melted by the ventilation outside air and removed. On the other hand, since the hot as cycle circuit 31 is not present, the high temperature refrigerant cannot be caused to flow through the internal heat exchanger 9 to release heat as in Embodiment 1, regardless of the outside air temperature.

The controller 43 in this embodiment accordingly energizes the electric heater 44 to generate heat, in the case of defrosting the external heat exchanger 7. When defrosting the external heat exchanger 7 during heating, the refrigerant having released heat in the radiator 4 is decompressed and caused to flow through the ventilation heat exchanger 24 while the refrigerant is kept from flowing through the external heat exchanger 7, and also the vehicle interior is heated by the electric heater 44. Thus, the electric heater 44 can heat the vehicle interior in addition to the heating by the heat release from the radiator 4, and also the ventilation heat exchanger 24 can recover heat from the air of the vehicle interior discharged to the outside.

In the case where heat cannot be drawn from the outside air by heat pump operation because of the need to defrost the external heat exchanger 7 during heating, the electric heater 44 supplements the heating by the radiator 4. This contributes to comfortable vehicle interior heating even at low outside air temperatures. Moreover, the ventilation heat exchanger 24 recovers heat discarded to the outside, thus minimizing the decrease in efficiency. Therefore, the decrease in cruising range can be minimized particularly in an electric vehicle in which the compressor 2 is driven by a battery. In an environment where the outside air temperature is above freezing, on the other hand, the external beat exchanger 7 can be simultaneously defrosted by outside air ventilation.

DESCRIPTION OF REFERENCE NUMERALS

R refrigerant circuit
1 vehicular air-conditioning unit
2, 2A, 2B compressor
3 ventilation duct
4 radiator
6, 8, 22 expansion valve
7 external heat exchanger
9 internal heat exchanger
16, 17, 18, 19, 32, 34 solenoid valve
21 ventilation heat exchanger circuit
23 ventilation duct
24 ventilation heat exchanger
26 check valve
27, 28, 42 temperature sensor
31 hot gas cycle circuit
39 pressure sensor
43 controller
44 electric heater
46 evaporation pressure regulation valve
47 outside air duct
48 damper

The invention claimed is:

1. A vehicular air-conditioning unit in which: a refrigerant circuit includes a compressor, a radiator, an external heat exchanger, an internal heat exchanger, and a ventilation heat exchanger for absorbing heat from air discharged from a vehicle interior to outside; during heating, a refrigerant discharged from the compressor releases heat in the radiator into the vehicle interior, and the refrigerant decompressed after the heat release in the radiator evaporates in at least one of the external heat exchanger and the ventilation heat exchanger; and during cooling, the refrigerant discharged from the compressor releases heat in the external heat exchanger, and the refrigerant decompressed after the heat release in the external heat exchanger evaporates in the internal heat exchanger to absorb heat from the vehicle interior, the vehicular air-conditioning unit comprising a hot gas cycle circuit for decompressing a part of the refrigerant discharged from the compressor, and causing the decompressed part of the refrigerant to flow through the internal heat exchanger to release heat into the vehicle interior.

2. The vehicular air-conditioning unit according to claim 1, wherein in at least one of the case where the external heat exchanger is to be defrosted and the case where an outside air temperature is a predetermined low value during heating, the refrigerant having released heat in the radiator is decompressed and caused to flow through the ventilation heat exchanger while the refrigerant is kept from flowing through the external heat exchanger, and the part of the refrigerant discharged from the compressor is caused to flow through the hot gas cycle circuit.

3. The vehicular air-conditioning unit according to claim 2, wherein the refrigerant having evaporated in the external heat exchanger or the refrigerant having passed through the hot gas cycle circuit and released heat in the internal heat exchanger is sucked into a low pressure part of the compressor, and the refrigerant having evaporated in the ventilation heat exchanger is returned to an intermediate pressure part of the compressor.

4. The vehicular air-conditioning unit according to claim 3, wherein in the case where the refrigerant is kept from flowing through the external heat exchanger and the hot gas cycle circuit or in the case where a temperature of the vehicle interior is a predetermined low value, the refrigerant having evaporated in the ventilation heat exchanger is returned to the low pressure part of the compressor.

5. The vehicular air-conditioning unit according to claim 2, wherein in a state where flow of the refrigerant into the external heat exchanger and flow of the refrigerant into the ventilation heat exchanger are stopped alternately during heating, whether or not the heat exchanger needs to be defrosted is determined, and the refrigerant is kept from flowing through the ventilation heat exchanger in the case of defrosting the ventilation heat exchanger.

6. The vehicular air-conditioning unit according to claim 2, wherein during heating, a state in which the refrigerant is caused to flow through the external heat exchanger while the refrigerant is kept from flowing through the hot gas cycle circuit is resumed in the case where defrosting of the external heat exchanger is completed, and whether or not the defrosting of the external heat exchanger is completed is not determined in the case where a temperature of the outside is below freezing.

7. The vehicular air-conditioning unit according to claim 1, comprising
an evaporation pressure regulation valve for preventing an evaporation temperature of the refrigerant in the ventilation heat exchanger from dropping below freezing.

8. The vehicular air-conditioning unit according to claim 1, wherein air of the vehicle interior having passed through the ventilation heat exchanger is circulated through the external heat exchanger.

9. The vehicular air-conditioning unit according to claim 8, comprising
a duct for circulating outside air through the external heat exchanger,
wherein the air of the vehicle interior having passed through the ventilation heat exchanger is caused to flow into the duct on an upstream side of the external heat exchanger, and an opening of an inflow part for the air of the vehicle interior is narrowed.

10. The vehicular air-conditioning unit according to claim 9, comprising
a damper for regulating the opening of the inflow part for the air of the vehicle interior in the duct.

11. The vehicular air-conditioning unit according to claim 1, comprising
an electric heater for heating the vehicle interior during heating.

12. A vehicular air-conditioning unit in which: a refrigerant circuit includes a compressor, a radiator, an external heat exchanger, an internal heat exchanger, and a ventilation heat exchanger for absorbing heat from air discharged from a vehicle interior to outside; during heating, a refrigerant discharged from the compressor releases heat in the radiator into the vehicle interior, and the refrigerant decompressed after the heat release in the radiator evaporates in at least one of the external heat exchanger and the ventilation heat exchanger; and during cooling, the refrigerant discharged from the compressor releases heat in the external heat exchanger, and the refrigerant decompressed after the heat release in the external heat exchanger evaporates in the internal heat exchanger to absorb heat from the vehicle interior, the vehicular air-conditioning unit comprising
an electric heater,
wherein in the case of defrosting the external heat exchanger during heating, the refrigerant having released heat in the radiator is decompressed and caused to flow through the ventilation heat exchanger while the refrigerant is kept from flowing through the external heat exchanger, and the vehicle interior is heated by the electric heater.

* * * * *